US009581269B2

(12) United States Patent
Smick

(10) Patent No.: US 9,581,269 B2
(45) Date of Patent: *Feb. 28, 2017

(54) SLEEVE VALVE WITH SYNC CAM

(71) Applicant: Mueller International, LLC, Atlanta, GA (US)

(72) Inventor: Stephen J. Smick, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,373

(22) Filed: Mar. 11, 2016

(65) Prior Publication Data

US 2016/0195197 A1     Jul. 7, 2016

Related U.S. Application Data

(60) Division of application No. 14/577,731, filed on Dec. 19, 2014, which is a continuation of application No.
(Continued)

(51) Int. Cl.
| | |
|---|---|
| *F16K 31/50* | (2006.01) |
| *F16K 3/316* | (2006.01) |

(Continued)

(52) U.S. Cl.
CPC ............... *F16K 31/508* (2013.01); *F16K 3/24* (2013.01); *F16K 3/314* (2013.01); *F16K 3/316* (2013.01);
(Continued)

(58) Field of Classification Search
CPC ........ F16K 3/316; F16K 3/314; F16K 31/508; F16K 3/24; Y10T 137/0318;
(Continued)

(56) References Cited

U.S. PATENT DOCUMENTS

| | | |
|---|---|---|
| 1,462,110 A | 7/1923 | Hostetter et al. |
| 1,687,317 A | 10/1928 | Archer |
| | (Continued) | |

FOREIGN PATENT DOCUMENTS

JP     2000097354     4/2000

OTHER PUBLICATIONS

Smick, Stephen J.; Non-Final Office Action for U.S. Appl. No. 14/577,731, filed Dec. 19, 2014, mailed May 9, 2016, 17 pgs.
(Continued)

*Primary Examiner* — Umashankar Venkatesan
(74) *Attorney, Agent, or Firm* — Taylor English Duma LLP

(57) ABSTRACT

A method of controlling the flow of a fluid in a pipe system includes controlling a sleeve valve in the pipe system, the sleeve valve includes a valve body having an inner surface and an outer surface defining an inlet, an outlet, and a body cavity between the inlet and the outlet, a sleeve disposed at least partially within the body cavity, the sleeve including at least one opening fluidly connecting the inlet to the outlet, a gate proximate to the sleeve, and a drive assembly including a pair of drive lines, each drive line including a drive shaft, a first drive line of the pair of drive lines including a sync cam on the first drive line movably positioned between the front stop and the back stop, and moving the gate to uncover the at least one opening to allow fluid to flow from the inlet to the outlet.

20 Claims, 18 Drawing Sheets

Related U.S. Application Data

13/741,326, filed on Jan. 14, 2013, now Pat. No. 8,960,229.

(51) Int. Cl.
*F16K 3/24* (2006.01)
*F16K 3/314* (2006.01)

(52) U.S. Cl.
CPC .... *Y10T 137/0318* (2015.04); *Y10T 137/6106* (2015.04); *Y10T 137/86759* (2015.04); *Y10T 137/86807* (2015.04)

(58) Field of Classification Search
CPC ....... Y10T 137/86759; Y10T 137/6106; Y10T 137/86807
USPC ... 137/625.33, 625.3, 625.39, 315.4, 615.35, 137/219, 2, 12, 15, 18, 15.21, 15.01; 251/266, 274, 129.11, 344
See application file for complete search history.

(56) References Cited

U.S. PATENT DOCUMENTS

| | | |
|---|---|---|
| 2,830,617 A | 4/1958 | Brown |
| 3,605,787 A | 9/1971 | Krogross et al. |
| 3,821,968 A | 7/1974 | Barb |
| 4,036,248 A | 7/1977 | Yoshimori et al. |
| 4,040,443 A | 8/1977 | Okada et al. |
| 4,103,702 A | 8/1978 | Duthion et al. |
| 4,244,388 A | 1/1981 | Feiss |
| 4,375,821 A | 3/1983 | Nanao |
| 4,508,138 A | 4/1985 | Dixon |
| 4,512,359 A | 4/1985 | Hinojosa et al. |
| 4,520,846 A | 6/1985 | Dixon |
| 4,526,192 A | 7/1985 | Dixon |
| 4,573,492 A | 3/1986 | Tadokoro |
| 4,611,630 A | 9/1986 | Muchow et al. |
| 4,635,678 A | 1/1987 | Peterman et al. |
| 5,116,252 A | 5/1992 | Hartman |
| 5,269,343 A | 12/1993 | Trapp |
| 5,448,962 A | 9/1995 | Moody |
| 5,490,535 A | 2/1996 | Fromm |
| 5,503,176 A | 4/1996 | Dunmire et al. |
| 5,509,437 A | 4/1996 | Merrett |
| 5,584,314 A | 12/1996 | Bron |
| 5,950,660 A | 9/1999 | Hartman et al. |
| 6,681,792 B2 | 1/2004 | Edward et al. |
| 8,944,085 B2 | 2/2015 | Smick |
| 8,960,229 B2 | 2/2015 | Smick |
| 9,494,250 B2 | 11/2016 | Smick |
| 9,500,295 B2 | 11/2016 | Smick |

OTHER PUBLICATIONS

Smick, Stephen J.; Non-Final Office Action for U.S. Appl. No. 14/577,742, filed Dec. 19, 2014, mailed May 6, 2016, 17 pgs.
Smick, Stephen J.; Issue Notification for U.S. Appl. No. 13/741,326, filed Jan. 14, 2013, mailed Feb. 4, 2015, 1 pg.
Smick, Stephen J.; Non-Final Office Action for U.S. Appl. No. 13/741,326, filed Jan. 14, 2013, mailed May 6, 2014, 12 pgs.
Smick, Stephen J.; Notice of Allowance for U.S Appl. No. 13/741,326, filed Jan. 14, 2013, mailed Sep. 17, 2014, 7 pgs.
Smick, Stephen J.; Supplemental Notice of Allowability for U.S. Appl. No. 13/741,326, filed Jan. 14, 2013, mailed Dec. 31, 2014, 4 pgs.
Smick, Stephen J.; U.S. Patent Application entitled: Sleeve Valve With Sync Cam having U.S. Appl. No. 13/741,326, filed Jan. 14, 2013, 45 pgs.
Smick, Stephen J.; Non-Final Office Action for U.S. Appl. No. 14/577,731, filed Dec. 19, 2014, mailed Apr. 20, 2016, 16 pgs.
Smick, Stephen J.; Restriction Requirement for U.S. Appl. No. 14/577,731, filed Dec. 19, 2014, mailed Feb. 22, 2016, 5 pgs.
Smick, Stephen J.; U.S. Patent Application entitled: Sleeve Valve with Sync Cam, having U.S. Appl. No. 14/577,731, filed Dec. 19, 2014, 42 pgs.
Smick, Stephen J.; Issue Notification for U.S. Appl. No. 13/741,329, filed Jan. 14, 2013, mailed Jan. 14, 2015, 1 pg.
Smick, Stephen J.; Non-Final Office action for U.S. Appl. No. 13/741,329, filed Jan. 14, 2013, mailed May 7, 2014, 15 pgs.
Smick, Stephen J.; Notice of Allowance for U.S. Appl. No. 13/741,329, filed Jan. 14, 2013, mailed Sep. 17, 2014, 11 pgs.
Smick, Stephen J.; Supplemental Notice of Allowability for U.S. Appl. No. 13/741,329, filed Jan. 14, 2013, mailed Jan. 2, 2015, 4 pgs.
Smick, Stephen J.; U.S. Patent Application entitled: Valve With Sync Cam having U.S. Appl. No. 13/741,329, filed Jan. 14, 2013, 51 pgs.
Smick, Stephen J.; Non-Final Office Action for U.S. Appl. No. 14/577,742, filed Dec. 19, 2014, mailed Apr. 21, 2016, 16 pgs.
Smick, Stephen J.; Restriction Requirement for U.S. Appl. No. 14/577,742, filed Dec. 19, 2014, mailed Feb. 19, 2016, 5 pgs.
Smick, Stephen J.; U.S. Patent Application entitled: Valve with Sync Cam, having U.S. Appl. No. 14/577,742, filed Dec. 19, 2014, 48 pgs.
Smick, Stephen J.; U.S. Divisional Application entitled: Valve With Sync Cam having U.S. Appl. No. 15/067,385, filed Mar. 11, 2016, 49 pgs.
Duff-Norton; Technical Data Sheet—Machine Screw Actuator, 5-Ton Capacity; publicly available prior to Dec. 8, 2012; p. 25.
Smick, Stephen J.; Notice of Allowance for U.S. Appl. No. 14/577,731, filed Dec. 19, 2014, mailed Mar. 2, 2016, 9 pgs.
Smick, Stephen J.; Supplemental Notice of Allowance for U.S. Appl. No. 14/577,731, filed Dec. 19, 2014, mailed Oct. 17, 2016; 5 pgs.
Smick, Stephen J.; Notice of Allowance for U.S. Appl. No. 14/577,742, filed Dec. 19, 2014, mailed Mar. 5, 2016, 9 pgs.
Smick, Stephen J.; Supplemental Notice of Allowance for U.S. Appl. No. 14/577,742, filed Dec. 19, 2014, mailed Oct. 14, 2016; 5 pgs.
Smick, Stephen J.; Non-Final Office Action for U.S. Appl. No. 15/067,385, filed Mar. 11, 2016, mailed Aug. 8, 2016, 18 pgs.
Smick, Stephen J.; Issue Notification for U.S. Appl. No. 14/577,731, filed Dec. 19, 2014, mailed Nov. 2, 2016; 1 pg.
Smick, Stephen J.; Issue Notification for U.S. Appl. No. 14/577,742, filed Dec. 19, 2014, mailed Oct. 26, 2016; 1 pg.
Smick, Stephen J.; Notice of Allowance for U.S. Appl. No. 15/067,385, filed Mar. 11, 2016, mailed Dec. 1, 2016, 9 pgs.

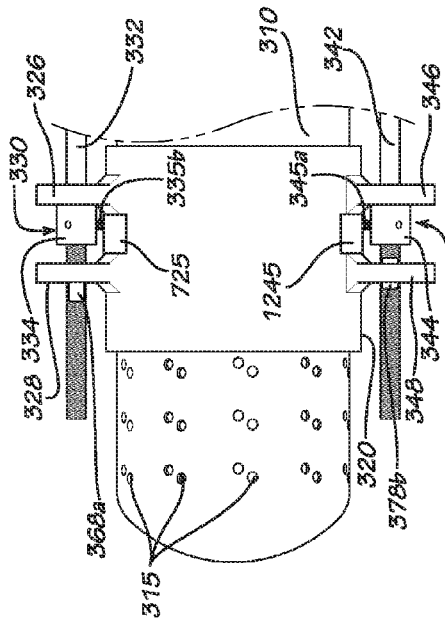
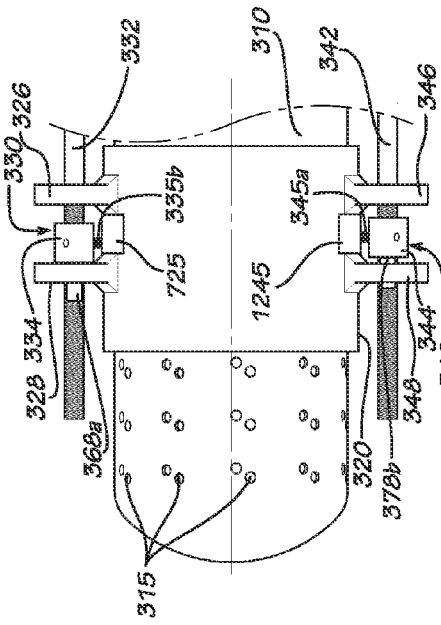
FIG. 19C
FIG. 19D
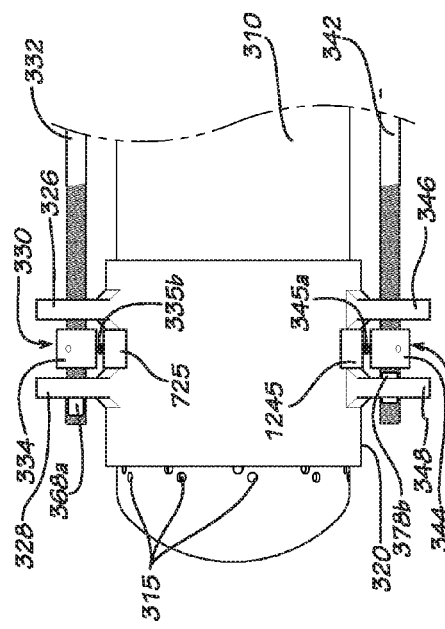
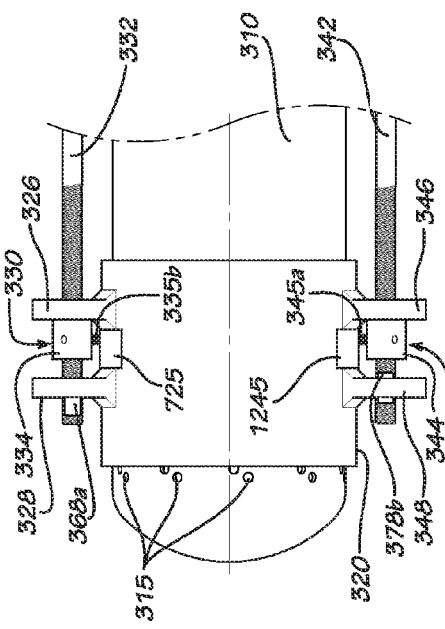
FIG. 19A
FIG. 19B

SLEEVE VALVE WITH SYNC CAM

REFERENCE TO RELATED APPLICATIONS

This application is a divisional of U.S. application Ser. No. 14/577,731, filed Dec. 19, 2014, which is a continuation of U.S. application No. 13/741,326, filed Jan. 14, 2013, which issued into U.S. Pat. No. 8,960,229, on Feb. 24, 2015, which is hereby specifically incorporated by reference herein in its entirety.

TECHNICAL FIELD

This disclosure relates to valves. More specifically, this disclosure relates to sleeve valves.

BACKGROUND

Valve elements are used to regulate or control the flow of material by opening, closing, or partially obstructing various passageways. One type of valve is a sleeve valve, which can be used in a number of applications. Some sleeve valves contain one or more perforations on a sleeve that allow for material to flow through the valve.

SUMMARY

Disclosed is a method of controlling the flow of fluid in a pipe system including controlling a sleeve valve in the pipe system, the sleeve valve including a valve body having an inner surface and an outer surface, the inner surface and the outer surface defining an inlet, an outlet, and a body cavity between the inlet and the outlet; a sleeve disposed at least partially within the body cavity, the sleeve including at least one opening fluidly connecting the inlet to the outlet; a gate proximate to the sleeve, the gate including a front stop and a back stop; and a drive assembly including a pair of drive lines, each drive line including a drive shaft, a first drive line of the pair of drive lines including a sync cam on the drive shaft of the first drive line, the sync cam of first drive line movably positioned between the front stop and the back stop, a first gap defined between the front stop and the sync cam, a second gap defined between the back stop and the sync cam; moving the sync cam to a front stop position, wherein the front stop position reduces the first gap; and moving the gate to uncover the at least one opening to allow fluid to flow from the inlet to the outlet.

Also disclosed is a method of controlling the flow of fluid in a pipe system including controlling a sleeve valve in the pipe system, the sleeve valve including a valve body having an inner surface and an outer surface, the inner surface and the outer surface defining an inlet, an outlet, and a body cavity between the inlet and the outlet; a sleeve disposed at least partially within the body cavity, the sleeve including at least one opening fluidly connecting the inlet to the outlet; a gate proximate to the sleeve, the gate including a front stop and a back stop; and a drive assembly including a pair of drive lines, each drive line including a drive shaft, a first drive line of the pair of drive lines including a sync cam on the drive shaft of the first drive line, the sync cam of first drive line movably positioned between the front stop and the back stop, a first gap defined between the front stop and the sync cam, a second gap defined between the back stop and the sync cam; moving the sync cam to a back stop position, wherein the back stop position reduces the second gap; and moving the gate to cover at least one opening to reduce fluid from flowing from the inlet to the outlet.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIGS. 19A, 19B, 19C, 19D, and 19E show a side view of the drive assembly and gate of FIG. 12 and show a method for controlling the flow of fluid through the sleeve valve.

DETAILED DESCRIPTION

Disclosed is a sleeve valve and associated methods, systems, devices, and various apparatus. The sleeve valve includes a drive assembly having at least one drive line including a sync cam and a drive shaft. It would be understood by one of skill in the art that the disclosed sleeve valve is described in but a few exemplary embodiments among many. No particular terminology or description should be considered limiting on the disclosure or the scope of any claims issuing therefrom.

Figure 1:
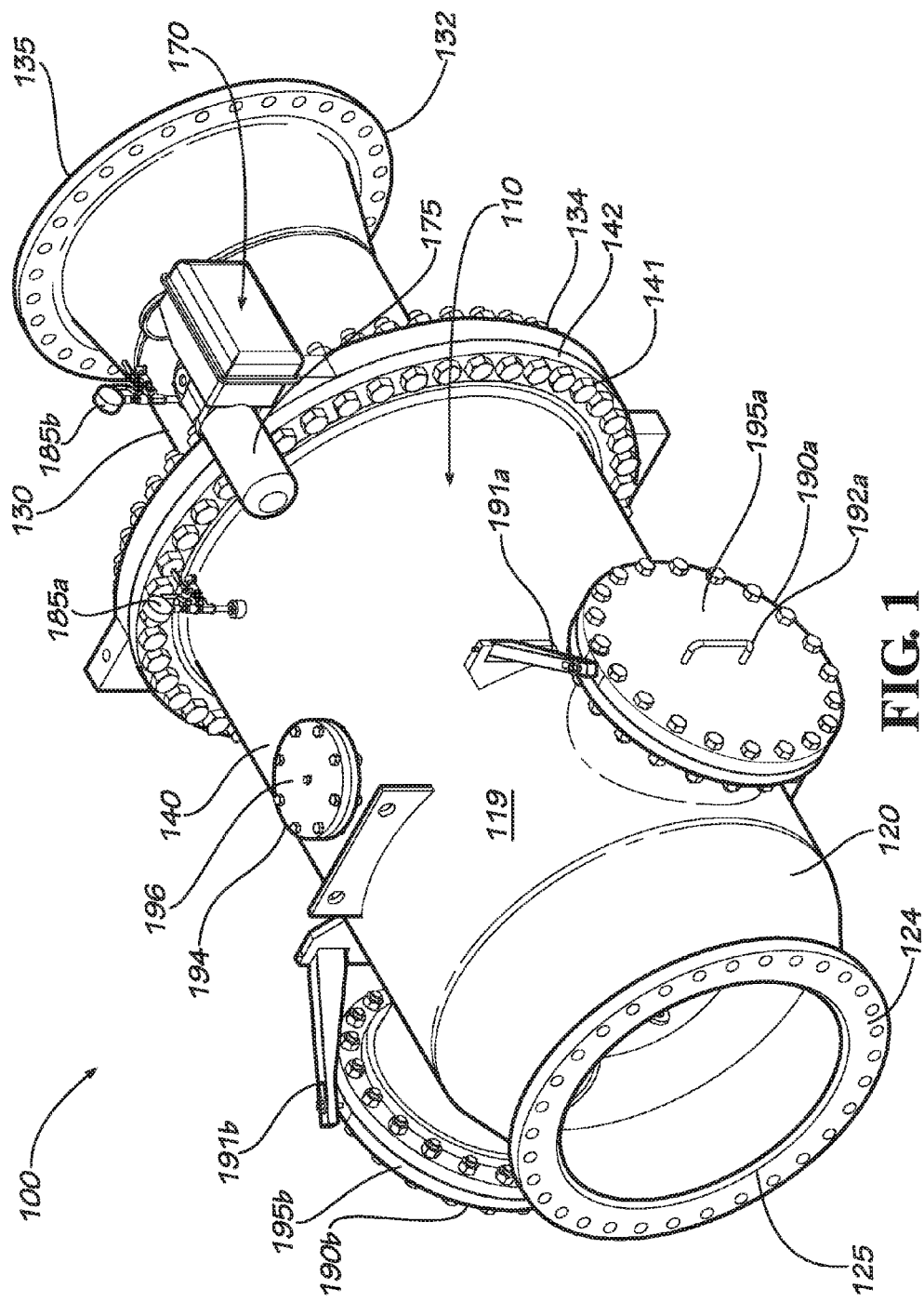
FIG. 1 is a perspective view of a sleeve valve in accord with one embodiment of the current disclosure.
Figure 2:
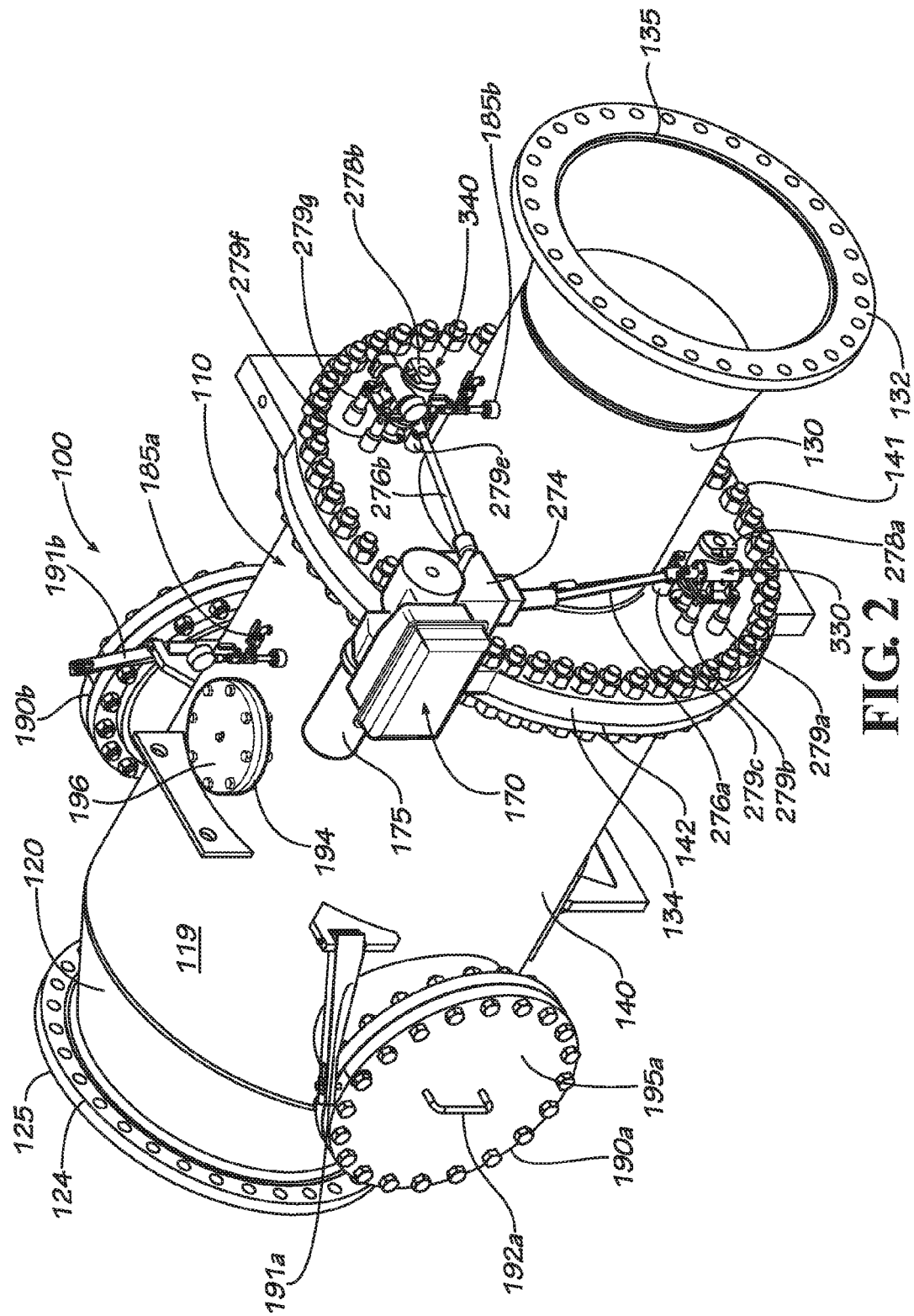
FIG. 2 is a perspective view from another end of the sleeve valve of FIG. 1.

One embodiment of a sleeve valve 100 is disclosed and described in FIGS. 1-2. In FIG. 1 the sleeve valve 100 includes a valve body 110 that has an inner surface 117 (shown in FIG. 3) and an outer surface 119. The inner surface 117 and the outer surface 119, as illustrated in the current embodiment, define an inlet portion 120, an outlet portion 130, and a body cavity portion 140. In the current embodiment, the inlet portion 120 defines an inlet 125 and is conical-shaped and welded to the body cavity portion 140, although other joining interfaces are contemplated by this disclosure and should be considered included. The outlet portion 130 defines an outlet 135. The outlet portion 130 and the body cavity portion 140, in the current embodiment, are both of an approximately cylindrical shape. The shape of the inlet portion 120, the outlet portion 130, and the body cavity portion 140 are not limiting and may be other shapes. The inlet portion 120, the outlet portion 130, and the body cavity portion 140 in the current embodiment are made of welded fabricated carbon steel plates, although one of skill in the art would recognize that other materials could be used and such a disclosure is not limiting. The inlet portion 120, the outlet portion 130, and the body cavity portion 140 may also include flanged ends, and as seen in the current embodiment in FIG. 1, the inlet portion 120 includes one flanged end 124 on the opposite end of that which is connected to the body cavity portion 140. Also, in the current embodiment, both ends of the outlet portion 130 include flanged ends 132 and 134, and the end of the body cavity portion 140 that faces the outlet portion 130 includes a flanged end 142.

The current embodiment includes fastening elements 141 in the form of a plurality of nuts and bolts coupling the flanged end 142 of the body cavity portion 140 to the flanged end 134 of the outlet portion 130 and thereby joining the body cavity portion 140 to the outlet portion 130. However, various types of fasteners, such as nails, screws, welding, or any other type of fastener may be used, and the disclosure of nuts and bolts is not limiting upon the fastener that must be used. Additionally, as illustrated in FIG. 1, the sleeve valve 100 includes a drive assembly 170 including an actuator motor 175 and drive lines (330 and 340 in FIG. 3). Further, the current embodiment of the sleeve valve 100 includes inspection ports 190a and 190b that are circular and defined in the body cavity portion 140 and include inspection lids 195a,b fastened to the outer surface 119 of the valve body 110 via a plurality of nuts and bolts. However, various types of fasteners, such as nails, screws, or any other type of fastener may be used, and the disclosure of nuts and bolts is not limiting upon the fastener that must be used. The shape of the inspection ports 190a and 190b is not limiting, and other shapes such as oval and square may be used. The inspection ports 190a and 190b allow access to the interior of the body cavity portion 140. In the current embodiment, inspection ports 190a,b include hinges 191a,b and handles 192a,b (192b not shown).

The current embodiment of the sleeve valve 100 also includes an access port 194 that is circular and defined on the outer surface 119 of the valve body 110. The access port 194 includes an access lid 196 fastened to the outer surface 119 of the valve body 110 via a plurality of nuts and bolts. However, various types of fasteners, such as nails, screws, or any other type of fastener may be used, and the disclosure of nuts and bolts is not limiting upon the fastener that must be used. Moreover, the shape of the access port 194 is not limiting and other shapes such as oval and square may be used. In the current embodiment, the body cavity portion 140 and the outlet portion 130 include pressure gauges 185a and 185b that are located on the outer surface 119, but these are not required for all embodiments.

FIG. 2 displays a perspective view of the sleeve valve 100 where the outlet portion 130 is in the foreground of the illustration. As can be seen in the current embodiment, the actuator motor 175 is mounted to the outer surface 119 of the flanged end 134 of the outlet portion 130, although the actuator motor 175 may be mounted to any portion of the sleeve valve 100. The actuator motor 175 is connected to the drive lines (330 and 340 in FIG. 3) by a splitter 274, or three-way gear, and two actuator drive shafts 276a and 276b extending from the splitter 274 to two separate machine screw actuators 278a and 278b, where actuator drive shaft 276a is attached to machine screw actuator 278a and actuator drive shaft 276b is attached to machine screw actuator 278b. Splitter 274 translates rotational movement from the actuator motor 175 to the actuator drive shafts 276a,b, which translate rotational movement to each machine screw actuator 278a,b, respectively. Machine screw actuator 278a is part of drive line 330 and machine screw actuator 278b is part of drive line 340. In the current embodiment, the machine screw actuators 278a and 278b are Duff-Norton Machine Screw Actuators, model number DM-9006; however, one of skill in the art would recognize that such a disclosure is not limiting and other types of machines or operations that enable the drive shaft 332 and/or 342 (described with reference to FIG. 3) to operate may be used. The drive assembly 170 can be operated in many different ways, including automatically from a remote location, via local controls on the actuator motor 175 itself, or via a clutch lever, and the methods of operation of the drive assembly 170 are not intended to be limiting. The actuator motor 175 is an electric motor, but may also be a manual handwheel in alternative embodiments. Additionally, in the current embodiment, actuator spacers 279a,b,c,d (279d not shown) mount machine screw actuator 278a to the outlet portion 130 and actuator spacers 279e,f,g,h (279h not shown) mount machine screw actuator 278b to the outlet portion 130, but the machine screw actuators 278a,b may be mounted to the outlet portion 130 by any other types or amount of fasteners.

Figure 3:
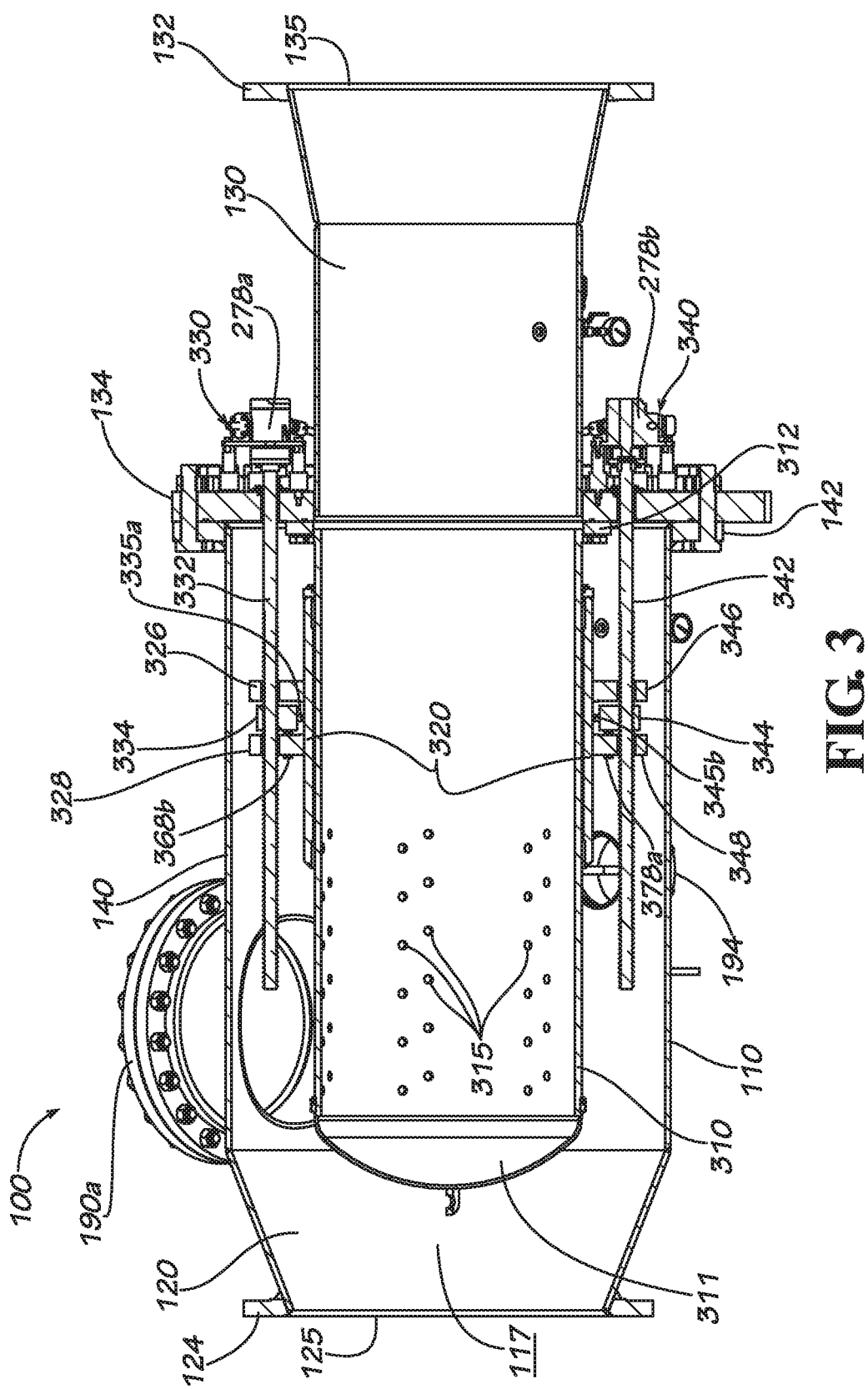
FIG. 3 is a cross-sectional view of the sleeve valve of FIG. 1.

FIG. 3 provides a cross-sectional view of the sleeve valve 100. In the current embodiment, material flows from the inlet portion 120 through a body cavity defined within the body cavity portion 140 to the outlet portion 130. Inspection port 190a and access port 194 are also shown in the current embodiment. In the current embodiment, a sleeve 310 is located within the body cavity portion 140 and is secured at a sleeve flanged end 312 to the outlet portion 130 by a plurality of nuts and bolts. The sleeve 310, in the current embodiment, is cylindrically shaped with a dome-shaped sleeve end 311 that prevents material from entering the sleeve 310 from sleeve end 311. The sleeve flanged end 312 is open to allow material to flow freely from the sleeve 310 to the outlet portion 130 once the material enters the interior of the sleeve. The shapes of sleeve end 311 and sleeve flanged end 312 are not limiting and other shapes may be used. Additionally, the technique of securing sleeve flanged end 312 of sleeve 310 to the outlet portion 130 may be achieved using any known technique in the art. The sleeve 310 in the current embodiment is made of a welded fabricated stainless steel plate, although one of skill in the art would recognize that other materials could be used and such a disclosure is not limiting.

In the current embodiment, sleeve 310 includes perforated openings 315, which allow material to flow from the body cavity portion 140 to the interior of the sleeve 310. Although multiple perforated openings 315 are shown in the current embodiment, only one perforated opening may be included, and any number of perforated openings may be included in various embodiments. In the current embodiment, perforated openings 315 refer to all openings in the sleeve 310. The elements to which reference 315 points are exemplary only and should not be considered limiting on the disclosure. Proximate to the sleeve 310, in the current embodiment, is a gate 320, which is moveable over a portion of the sleeve 310 including at least one of the perforated openings 315. When the gate 320, in the current embodiment, is positioned over at least one of the perforated openings 315, the gate 320 prevents material from flowing into or out of the interior of the sleeve 310 through the at least one perforated opening 315 that the gate 320 is positioned over. However, neither the material nor shape of the gate 320 is limiting, and various materials or shapes may be used in various embodiments. The gate 320 in the current embodiment is made of a welded fabricated stainless steel plate, although one of skill in the art would recognize that other materials could be used and such a disclosure is not limiting. As can be seen in FIG. 3, the current embodiment includes drive line 330, which operates to move the gate 320 axially over the sleeve 310. In the current embodiment, the drive line 330 includes a drive shaft 332, which is a cylindrical rod that rotates and includes at least a threaded portion.

The drive shaft 332 connects to the machine screw actuator 278a in the current embodiment. The drive shaft 332 in the current embodiment is made of stainless steel, although one of skill in the art would recognize that other materials could be used and such a disclosure is not limiting. The gate 320 will be enabled to move axially along the sleeve 310 within the portion of the drive shaft 332 that is threaded. Moreover, in the current embodiment, the drive line 330 includes a sync cam 334, which is moveably positioned around the drive shaft 332. Additionally, when the drive shaft 332 rotates the sync cam 334 may move axially between a front stop 326 in the form of a front stop plate and a back stop 328 in the form of a back stop plate, though other front stops and back stops may be used in other embodiments. The sync cam 334 in the current embodiment is made of a stainless steel plate, although one of skill in the art would recognize that other materials could be used and such a disclosure is not limiting.

Figure 4:
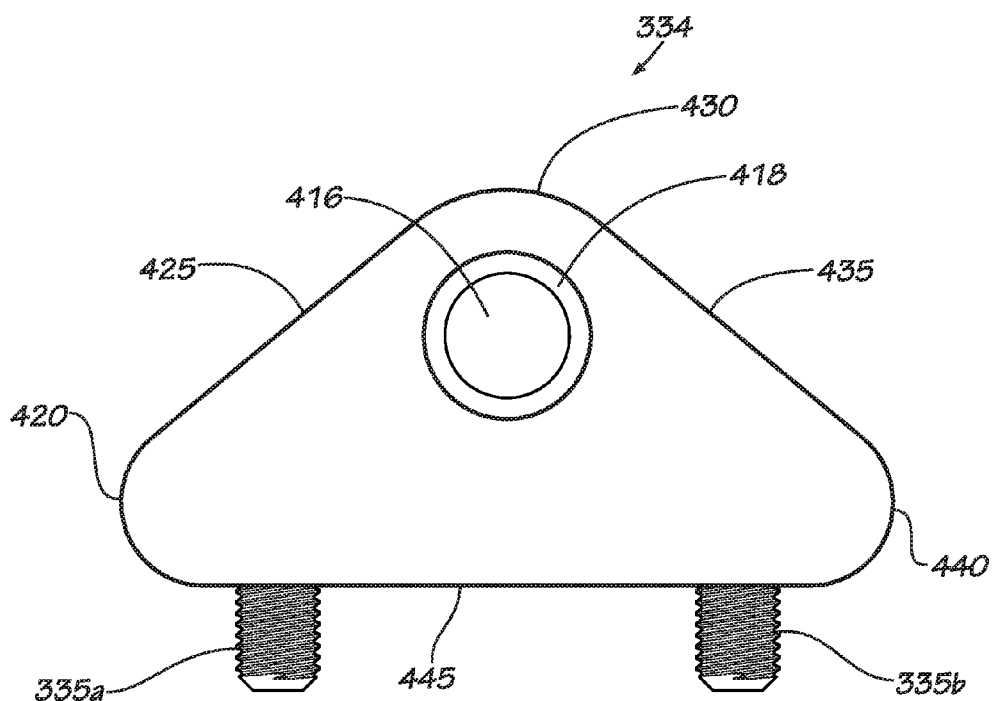
FIG. 4 is a side view of a sync cam of the sleeve valve of FIG. 1.
Figure 5:
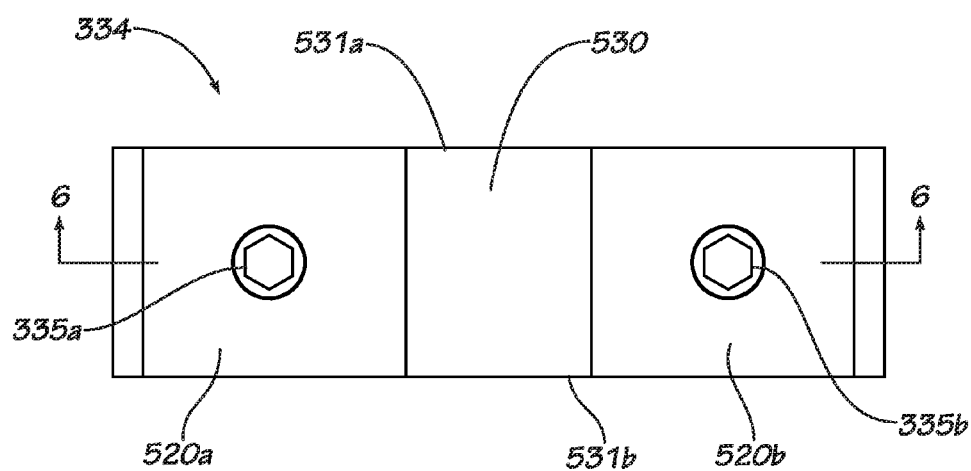
FIG. 5 is a top view of the sync cam of FIG. 4.
Figure 6:
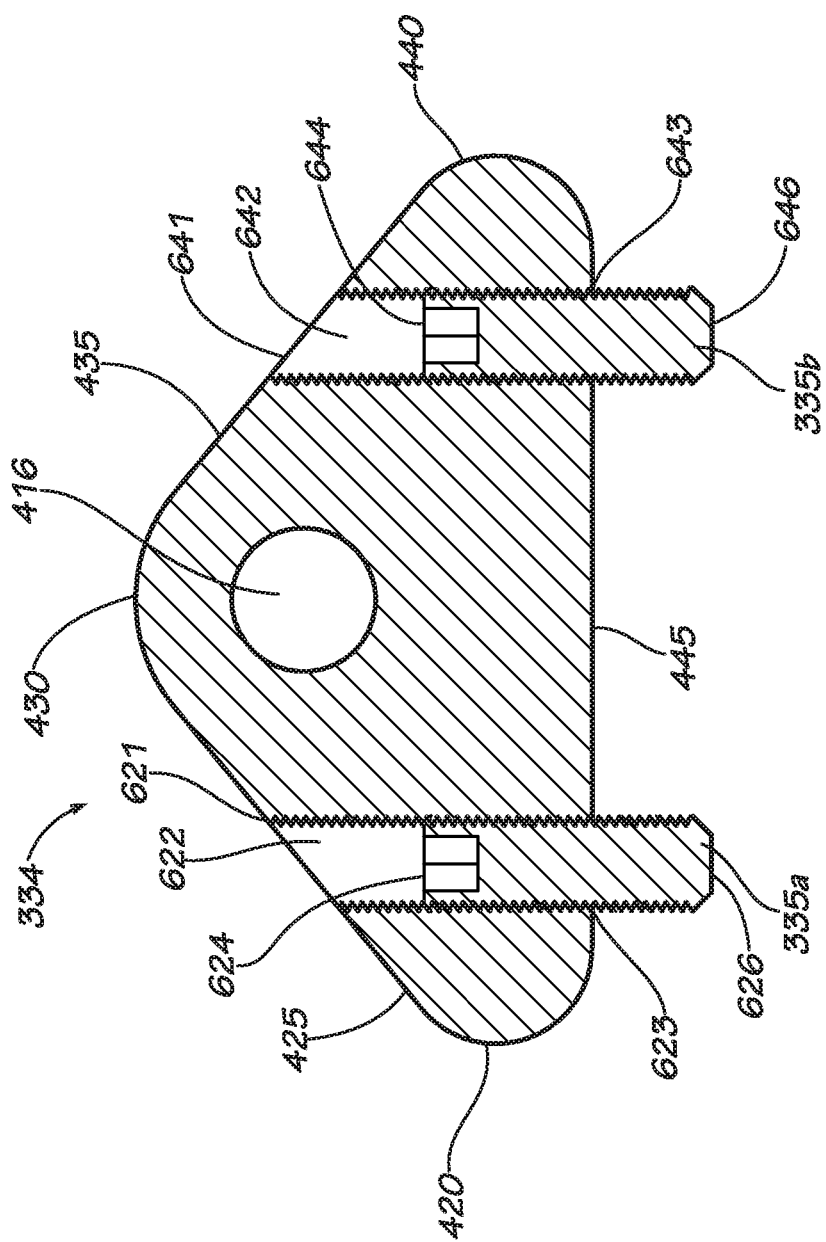
FIG. 6 is a cross-sectional view of the sync cam of FIG. 4.

In addition, the sync cam 334 in the current embodiment includes two forward direction load balancing screws 335a and 335b (335b shown in FIGS. 4-6). Although the current embodiment includes two forward direction load balancing screws 335a and 335b, other embodiments may include any number of forward direction load balancing mechanisms, which can be nuts and bolts, screws, other types of fasteners, or any other load balancing mechanism. Additionally, the drive line 330 may include more than one sync cam 334 and drive shaft 332. In the current embodiment, the front stop 326 and the back stop 328 are connected to and formed on the gate 320, but it is not a requirement that the front stop 326 and the back stop 328 be connected to or formed on the gate 320.

The front stop 326 and the back stop 328 can be plates or any other mechanism that hinders the sync cam 334 from moving past the front stop 326 or the back stop 328. The thickness of the sync cam 334 may be less than the distance between the front stop 326 and the back stop 328. Additionally, in the current embodiment, the back stop 328 includes two backward direction load balancing screws 368a,b (368a shown in FIGS. 7-8); however, this configuration is not meant to be limiting in terms of the type of mechanism used for backward direction load balancing and the number of backward direction load balancing mechanisms. The back stop 328 includes at least one backward direction load balancing mechanism, which can be achieved with nuts and bolts, screws, other types of fasteners, or any other load balancing mechanism which is known in the art.

The components of the drive line 330, in the current embodiment, are not meant to be limiting. Additional components may be added to the drive line 330 and the components in combination described above are not all required. In the current embodiment, an additional drive line 340 is provided, although it is not required, and is located approximately 180 degrees from drive line 330, though the drive line 340 may be located relative to the drive line 330 in any position in other embodiments. Drive line 340, in the current embodiment, is configured in the same way drive line 330 is configured. The drive line 340 includes a drive shaft 342, which is configured in the same way as drive shaft 332. The drive shaft 342 connects to the machine screw actuator 278b in the current embodiment. The drive line 340 also includes a sync cam 344, which is configured in the same way as sync cam 334, and the drive line 340 may include more than one sync cam 344 and drive shaft 342. Also, the sync cam 344 in the current embodiment includes two forward direction load balancing screws 345a,b (345a shown in FIG. 12). Although the current embodiment includes two forward direction load balancing screws 345a,b, that is not meant to be limiting. The sync cam 344 includes at least one forward direction load balancing mechanism, which can be achieved with nuts and bolts, screws, other types of fasteners, or any other load balancing mechanism.

In the current embodiment, a front stop 346 and a back stop 348 are connected to and formed on the gate 320, but it is not a requirement in all embodiments that the front stop 346 and the back stop 348 be connected to or formed on the gate 320. The front stop 346 and the back stop 348 can be plates or any other mechanism that hinders the sync cam 344 from moving past the front stop 346 or the back stop 348. Additionally, in the current embodiment, the back stop 348 includes two backward direction load balancing screws 378a,b (378b shown in FIG. 12); however, this configuration is not meant to be limiting in terms of the type of mechanism used for backward direction load balancing and the number of backward direction load balancing mechanisms. The back stop 348 includes at least one backward direction load balancing mechanism, which can be achieved with nuts and bolts, screws, other types of fasteners, or any other load balancing mechanism which is known in the art. Although in the current embodiment the drive line 340 is configured in the same way and includes all of the same components as drive line 330, the embodiment is not meant to be limiting. Drive line 340 may also include additional components, and the components in combination described above are not all required. Moreover, additional drive lines may be implemented with the sleeve valve 100.

FIG. 4 is a side view of a sync cam 334 of the sleeve valve 100. In the current embodiment the sync cam 344 includes the same features as sync cam 334, although such a configuration is not required. The sync cam 334, in the current embodiment, is triangularly shaped with sides 425, 435, and 445 that connect the rounded ends 420, 430, and 440, although the shape of the sync cam 334 is not critical. In the current embodiment, the sync cam 334 includes two forward direction load balancing screws 335a and 335b. Sync cam 334, in the current embodiment, also defines a circular drive shaft bore 416 through the upper center portion of the sync cam 334, although the position and shape of the bore is not critical. The drive shaft bore 416 is threaded in the current embodiment. Additionally, the drive shaft bore 416 of the sync cam 334, in the current embodiment, includes threads 418 along the drive shaft bore 416, although the threads 418 are not critical.

FIG. 5 is a top view of sync cam 334. In the current embodiment the sync cam 344 is configured the same way as sync cam 334, although such a configuration is not required. In the current embodiment, the sync cam 334 is triangular shaped with rounded edges, although the shape of the sync cam 334 is not critical. In the current embodiment, the sync cam 334 includes two lobes 520a and 520b, which are located on each side of the middle section 530. Also, each lobe 520a and 520b extends from the sync cam 334 a distance longer than a distance between the drive shaft 332 and a gate surface 721 (shown in FIG. 7) of the gate 320. In the current embodiment, the middle section 530 includes side edges 531a and 531b, which extend along the lobes 520a and 520b as well. The distance between side edges 531a and 531b, or in essence the thickness of the sync cam 334, is less than the distance between the front stop 326 and the back stop 328 of the drive line 330 in the current embodiment. Sync cam 334, in the current embodiment, also includes two forward direction load balancing screws 335a and 335b, extending through each lobe 520a and 520b; however, this configuration is not meant to be limiting in terms of the type of mechanism used for forward direction load balancing and the number of forward direction load balancing mechanisms.

FIG. 6 is a cross-sectional view of sync cam 334 taken from line 6-6 in FIG. 5. In the current embodiment the sync cam 344 is configured the same way as sync cam 334, although such a configuration is not necessary. In the current embodiment, the sync cam 334 includes two forward load balancing holes 622 and 642, which are threaded in the current embodiment. Although the current embodiment includes two forward direction load balancing holes 622 and 642, such a configuration is not meant to be limiting. Depending on whether or not the type of forward direction load balancing mechanism requires a hole or holes, forward direction load balancing holes 622 and 642 might or might not be necessary; in some embodiments, more forward direction load balancing holes may be required. The length of the forward direction load balancing screws 335a and 335b is about the same as the length of the forward direction load balancing holes 622 and 642. The length of the forward direction load balancing screws 335a and 335b is the distance from ends 624 and 644 to ends 626 and 646, respectively; however, this length is not critical. The length of the forward direction load balancing holes 622 and 642 is the distance from ends 621 and 623 (closest portion of the hole to rounded end 430) to ends 641 and 643, respectively.

Figure 7:
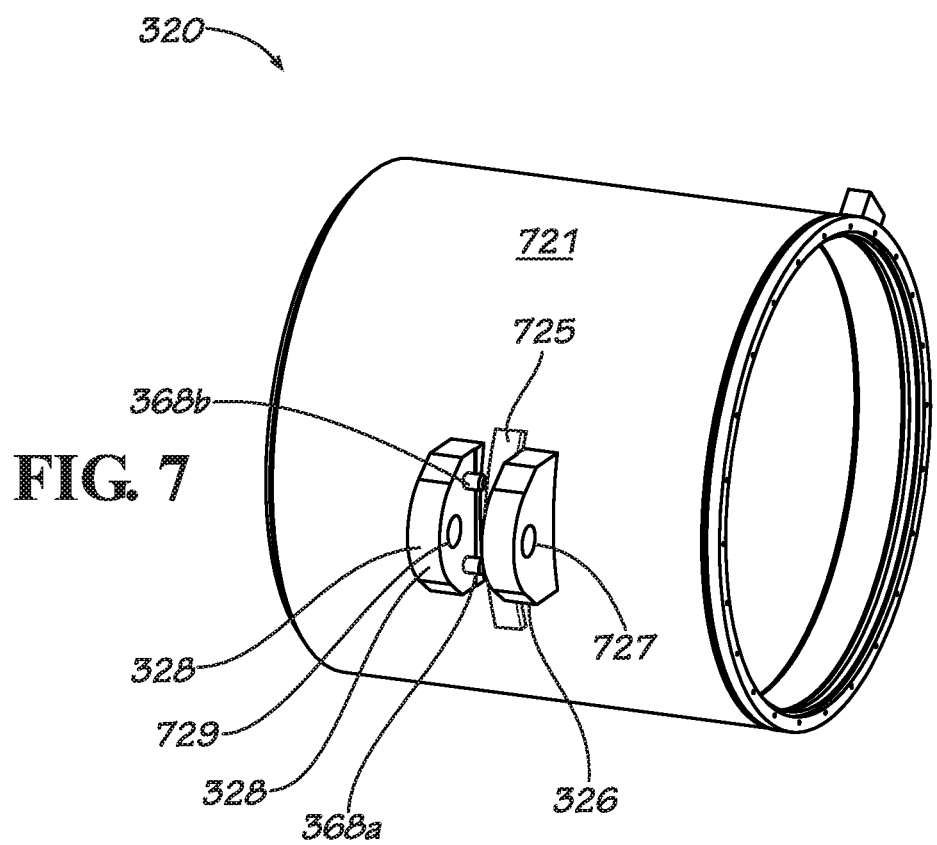
FIG. 7 is a perspective view of a gate of the sleeve valve of FIG. 1.
Figure 8:
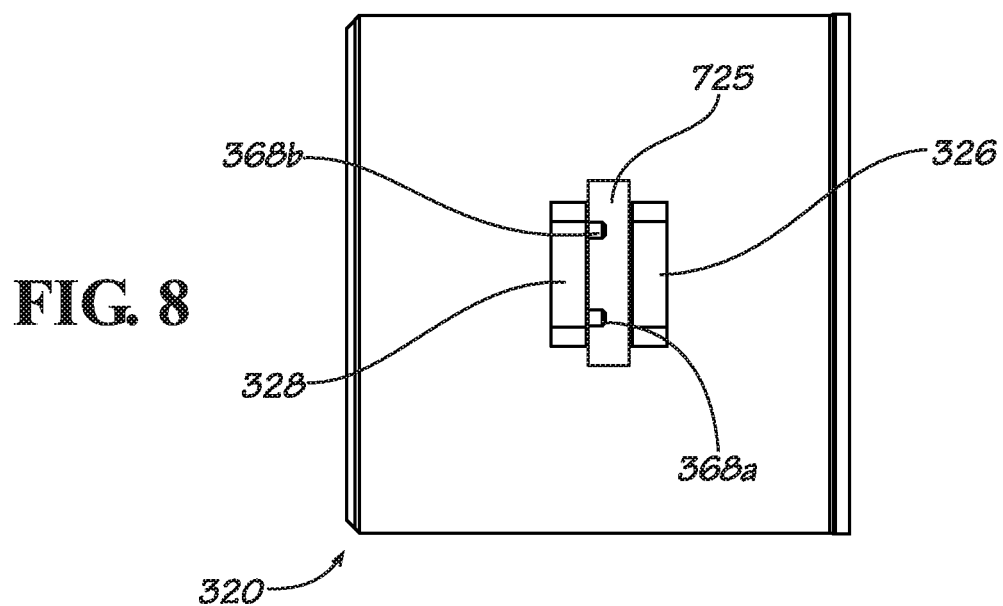
FIG. 8 is a top view of the gate of FIG. 7.

FIG. 7 is a perspective view of gate 320 for sleeve valve 100. Gate 320 includes gate surface 721, which in the current embodiment is made of a welded fabricated stainless steel plate. As shown and described with reference to FIG. 3,when the gate 320 is positioned over at least one of the perforated openings 315, the material used for gate 320 prevents fluid material from flowing into or out of the interior of the sleeve 310 through the at least one perforated opening 315 over which the gate 320 is positioned. The shape of gate 320 enables the gate 320 to be moveable over a portion of the sleeve 310, as seen in FIG. 3, including at least one of the perforated openings 315 (also seen in FIG. 3). The distance between the front stop 326 and the back stop 328 is greater than the thickness of the sync cam 334. Additionally, the front stop 326 and the back stop 328 each include a drive shaft hole 727 and 729, respectively. The drive shaft holes 727 and 729 provide a through-hole for the drive shaft 332 to fit through (seen in FIG. 3). Further, one or more additional drive shafts, such as drive shaft 342, may be included (seen in FIG. 3). If drive shaft 342 is included, then the front stop 346 and back stop 348 would also include drive shaft holes. Also, in the current embodiment, located on the gate surface 721 of the gate 320, between the front stop 326 and the back stop 328, is an adjustment plate 725, which provides a raised surface which the two forward direction load balancing screws 335a and 335b may contact when they are screwed down. There also may be an adjustment plate 1245 (shown in FIG. 12) between the front stop 346 and back stop 348. FIG. 8 is a top view of gate 320, and the elements are described with reference to FIG. 7.

Figure 9:
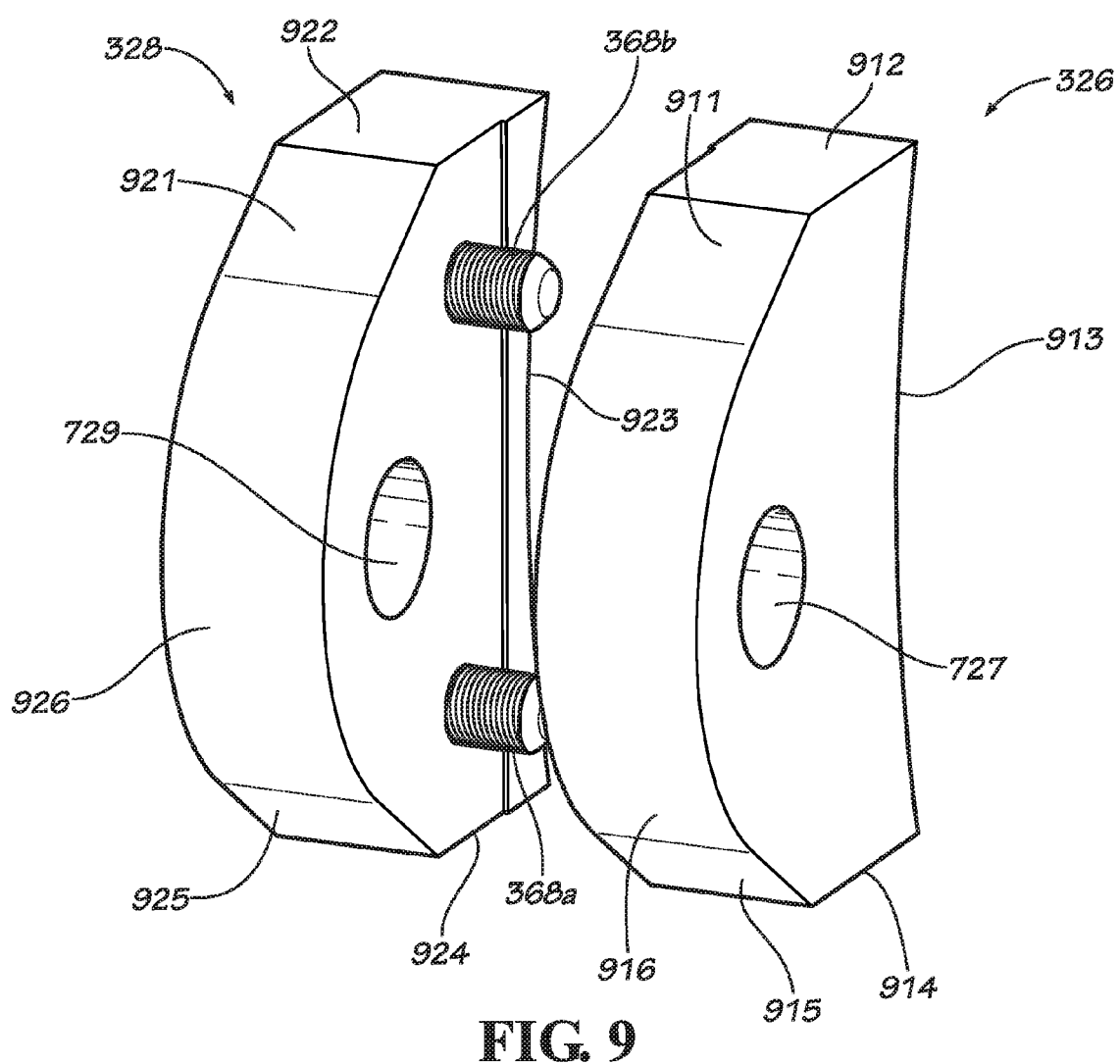
FIG. 9 is a perspective view in isolation of a front stop and a back stop of the sleeve valve of FIG. 1.

FIG. 9 is a perspective view of the front stop 326 and the back stop 328. In some embodiments, the front stop 346 and the back stop 348 are included and function the same way as previously disclosed in FIG. 3. In the current embodiment, the front stop 326 and the back stop 328 are six-sided and made of solid material. Front stop 326 includes flat edges at top right side 911, right side 912, left side 914, and top left side 915. Additionally, the front stop 326 includes a rounded top side 916 and a rounded bottom side 913 that approximates the curvature of the gate surface 721. Back stop 328 includes flat edges top right side 921, right side 922, left side 924, and top left side 925. Additionally, the back stop 328 includes a rounded edge top side 926 and a rounded bottom side 923 that approximates the curvature of the gate surface 721. Although, in the current embodiment, the front stop 326 and the back stop 328 each include six sides that result in the shapes seen in FIG. 9, such a disclosure is not meant to be limiting. Other shapes such as a square, rectangle, triangle, and polygon, among others, may be used for the front stop 326 and the back stop 328. Moreover, the front stop 326 and the back stop 328 need not be of the same shape. Also, in the current embodiment, the front stop 326 and the back stop 328 include drive shaft holes 727 and 729, respectively, as described in the description of FIG. 7.

Figure 10:
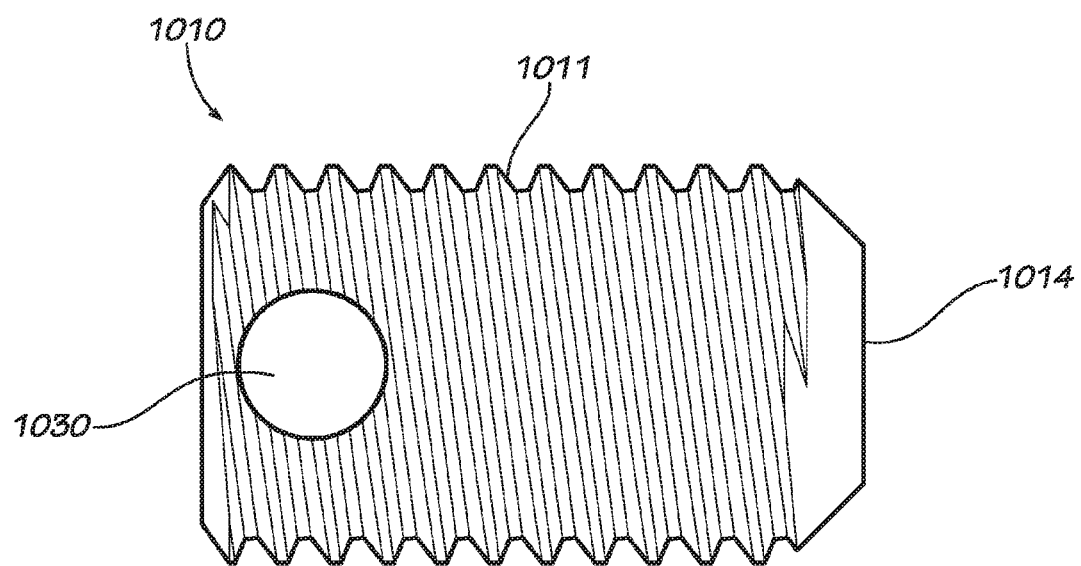
FIG. 10 is a side view of a front direction load balancing screw of the sync cam of FIG. 4. In the current embodiment the front direction load balancing screw is identical to a backward direction load balancing screw.
Figure 11:
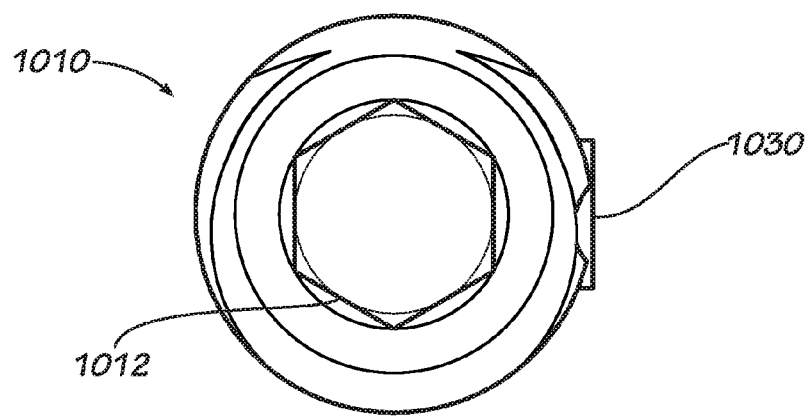
FIG. 11 is a top view of the front direction load balancing screw of FIG. 10. In the current embodiment the front direction load balancing screw is identical to the backward direction load balancing screw.

FIGS. 10-11 show load balancing screw 1010. The load balancing screw 1010 can be the forward direction load balancing screws 335a and 335b, as seen in FIG. 3, and/or the backward direction load balancing screws 368a and 368b, as seen in FIG. 9. In the current embodiment, the load balancing screw 1010 include a top end 1012 that connects to the head portion of the load balancing screws 1010, a threaded main portion 1011, and a bottom end 1014, which is a flat, non-threaded portion. However, the bottom end 1014, in the current embodiment, may be threaded or may be configured to end as a sharp point, and the current disclosure is not meant to be limiting. The load balancing screw 1010, in the current embodiment, also includes a self-locking mechanism 1030. The self-locking mechanism 1030 includes a piece of plastic material that is packed inside a bore through the side of the load balancing screw 1010. The self-locking mechanism 1030 in the current embodiment is not meant to be limiting, and other forms of self-locking may be used or a load balancing screw 1010 without a self-locking mechanism 1030 may be used as well.

As can be seen in the current embodiment, the top 1012 of load balancing screw 1010 is configured with a hexagonal head. However, the current embodiment is not meant to be limiting and the top 1012 can be configured to include other types of heads, such as a slot head, a cross-head, a torx head, or any other types of head. The top 1012 in the current embodiment is dome shaped, however, other shapes may be used for the top 1012, such as a low disc with a chamfered outer edge, cylindrical with a rounded top, truss shaped, flat, or any other shape.

Figure 12:
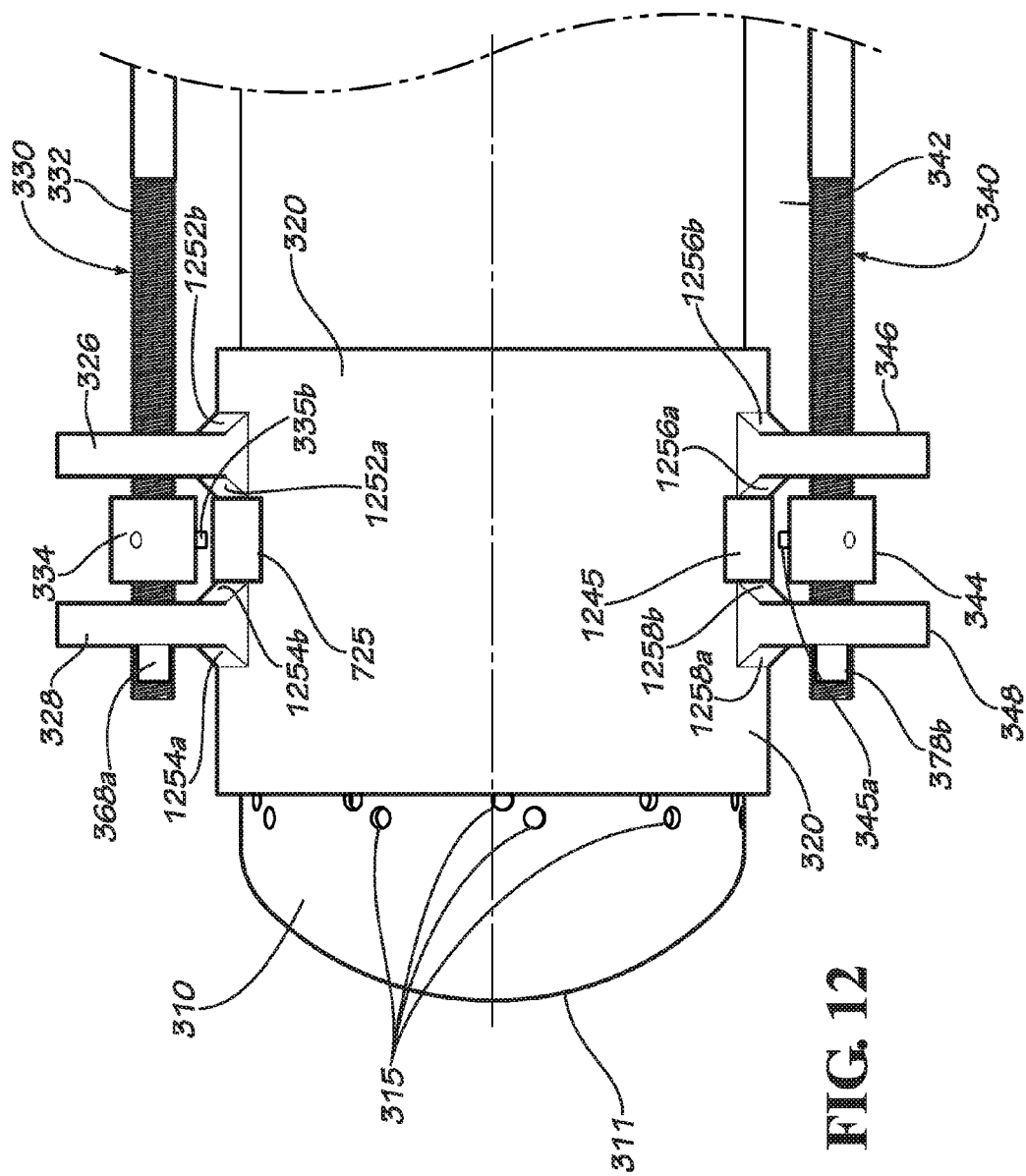
FIG. 12 is a side view of a pair of drive lines of a drive assembly and an alternative embodiment of a gate surrounding a sleeve of the sleeve valve of FIG. 1, wherein the view of a drive shaft of each drive lines is abridged, showing only a portion of the drive shaft.

FIG. 12 is a side view of the sleeve 310, gate 320, and drive lines 330 and 340. In the current embodiment as shown in FIG. 12, located on the gate 320, between the front stop 326 and the back stop 328, is the adjustment plate 725. Moreover, in the current embodiment, located on the gate 320, between the front stop 346 and the back stop 348, is the adjustment plate 1245, which provides a raised surface which the two forward direction load balancing screws 345a,b may contact when they are screwed down. Adjustment plate 725 and adjustment plate 1245 are not required and the two forward direction load balancing screws 335a,b and the two forward direction load balancing screws 345a,b may contact the gate surface 721 in other embodiments. Although in the current embodiment the drive line 340 is configured in the same way and includes all of the same components as drive line 330, the embodiment is not meant to be limiting. Drive line 340 may also include or different additional components, and the components in combination described above are not all required.

Also shown in FIG. 12 are a pair of front stop feet 1252a,b on the front stop 326, a pair of back stop feet 1254a,b on the back stop 328, a pair of front stop feet 1256a,b on the front stop 346, and a pair of back stop feet 1258a,b on the back stop 348. The front stop feet 1252a,b, 1256a,b provide support to the front stops 326,346, and the back stop feet 1254a,b, 1258a,b provide support to the back stops 328,348. However, front stop feet 1252a,b, 1256a,b and back stop feet 1254a,b, 1258a,b are not required.

Figure 13:
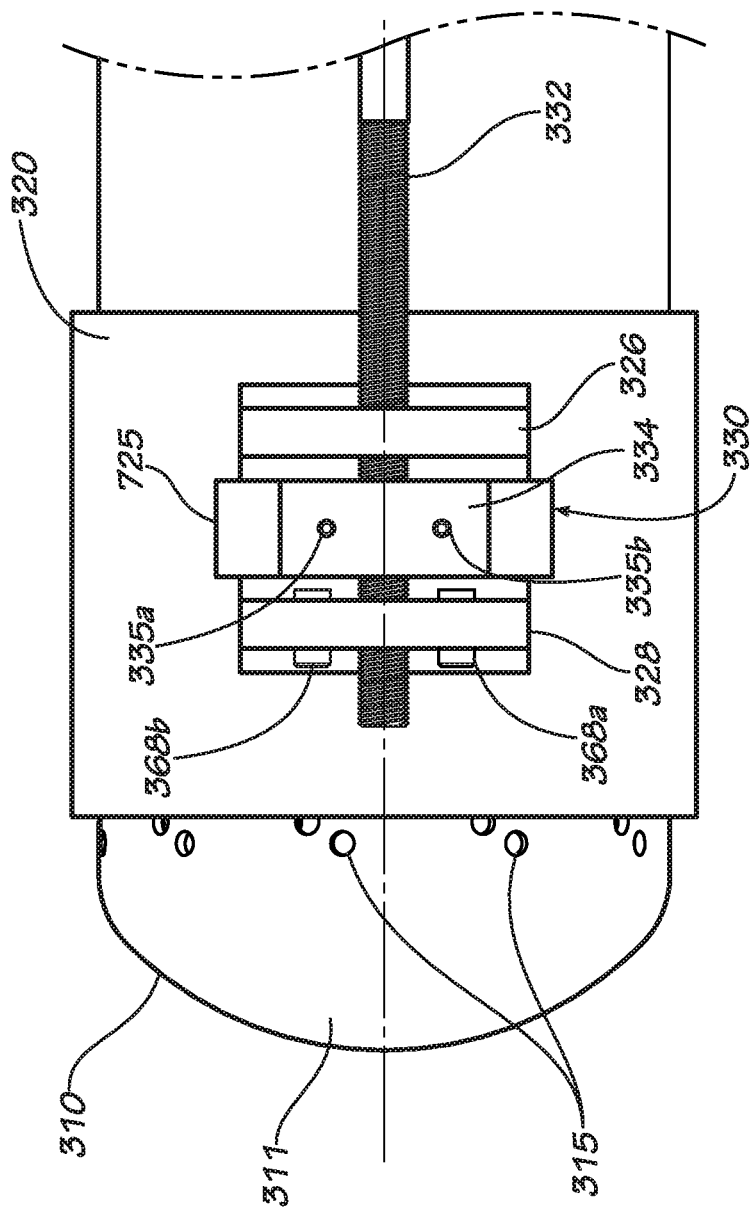
FIG. 13 is a top view of the gate and one of the the drive lines of FIG. 12.

FIG. 13 is a top view of the sleeve 310, the gate 320, and the drive line 330 from FIG. 12. The configuration of the drive line 340 is substantially the same as the configuration of drive line 330 as shown in the current embodiment.

Figure 14:
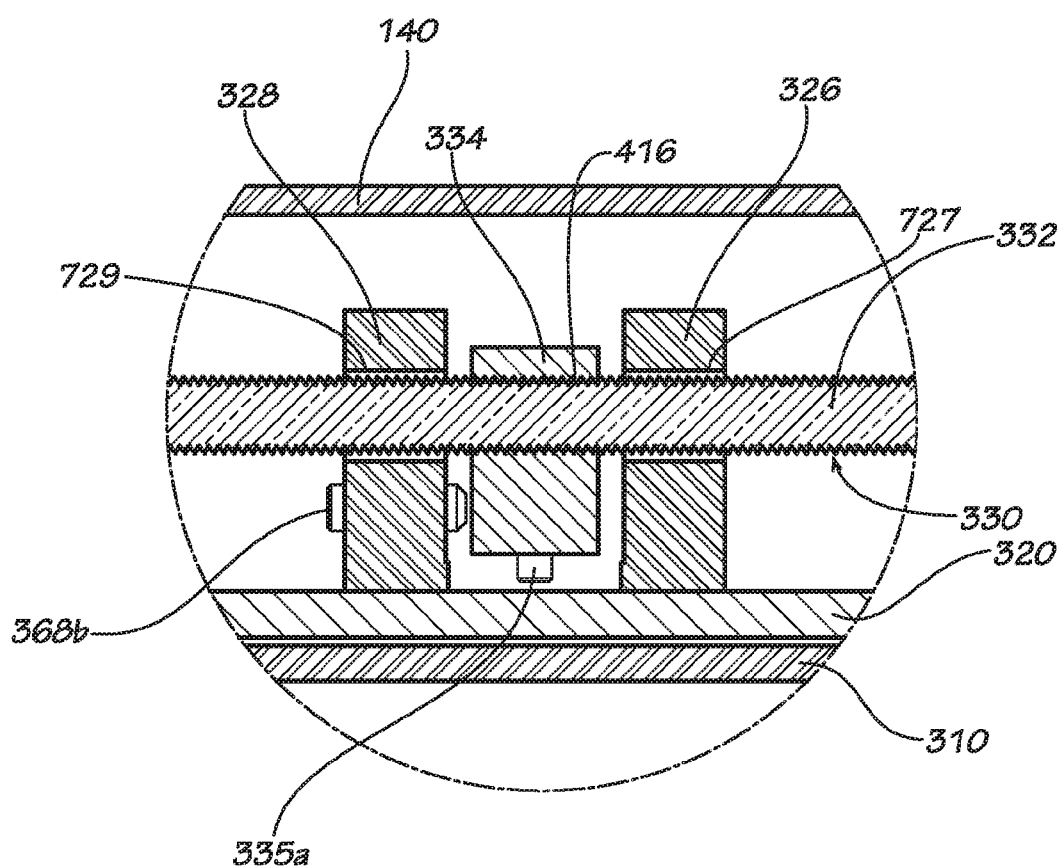
FIG. 14 is a cross-sectional detail view of the drive line, the gate, the sleeve, and a body cavity portion of the valve body of FIG. 1.

FIG. 14 is a cross-sectional detail view of the drive line 330 located proximate to the gate 320 and inside of the body cavity portion 140, seen in FIG. 1. The drive line 340 is configured substantially the same as drive line 330 in the current embodiment. In the current embodiment, the gate 320 is located proximate to the sleeve 310, and as seen in FIG. 14, there is nearly no space between gate 320 and sleeve 310, although there may be space in various embodiments. Further, FIG. 14 shows that the drive shaft 332 does not contact the front stop 326 and the back stop 328 in the current embodiment, but rather extends through the drive shaft holes 727, 729. The threads of the drive shaft 332 engage the threads 418 of the drive shaft bore 416 of the sync cam 334 to allow movement of the sync cam 334 along the drive shaft 332, though the drive shaft 332 may engage the sync cam 334 in any manner in other embodiments to allow movement of the sync cam 334 along the drive shaft 332. Because the sync cam 334 engages the drive shaft 332, the sync cam 334 is thereby moveably positioned relative to the drive shaft 332.

Figure 15:
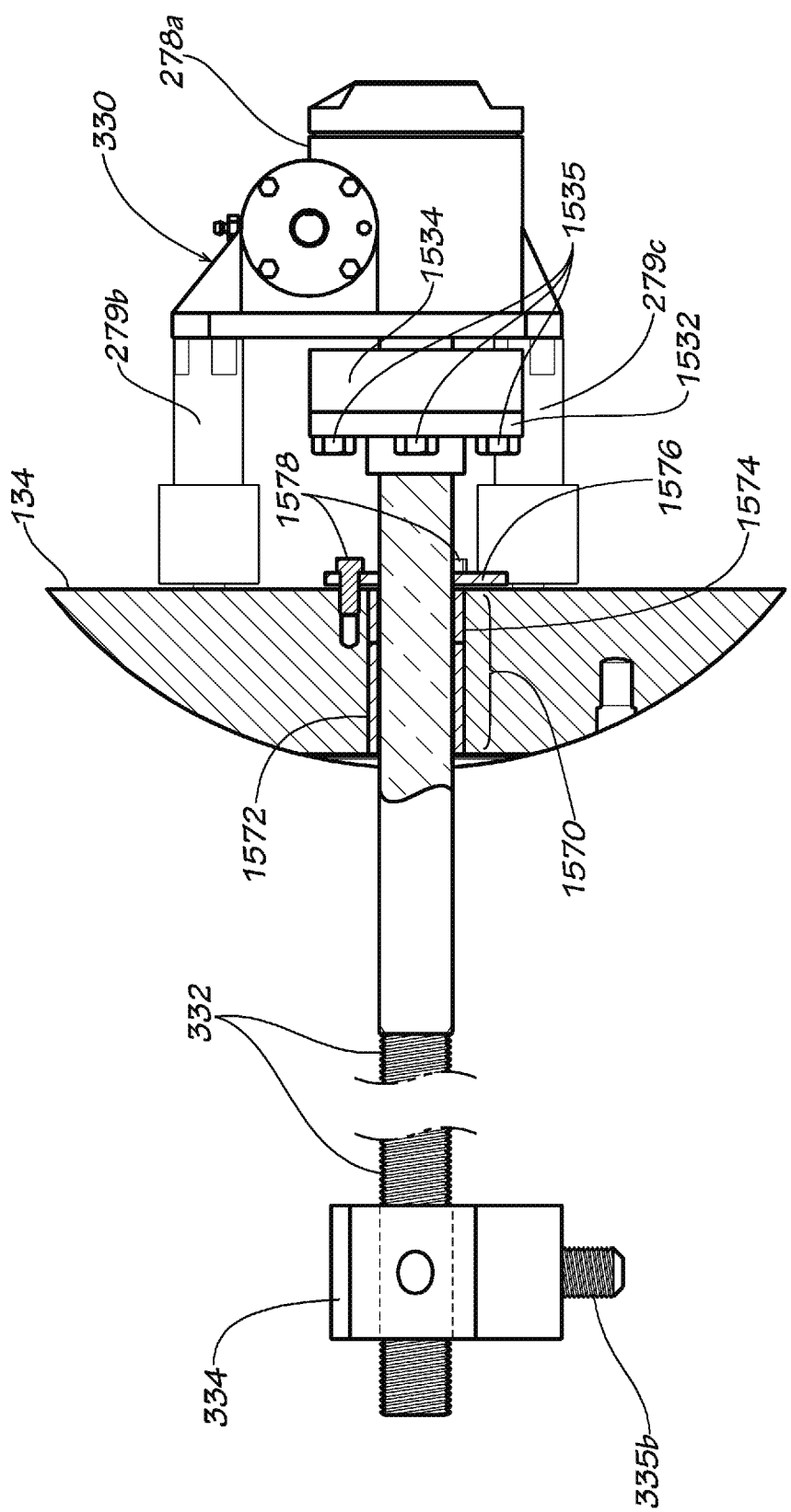
FIG. 15 is a side view of the drive line including the drive shaft, the sync cam, and an actuator located on an exterior of the sleeve valve, wherein the view of the drive shaft is abridged, showing only the front portion and the back portion of the drive shaft.

As seen in FIG. 15, the drive line 330 includes the sync cam 334 and the drive shaft 332. The sync cam 334 is moveably positioned relative to the drive shaft 332. Drive line 340 is configured the same way as the drive line 330 in the current embodiment. Additionally, the drive shaft 332 is threaded over the entire area in which the sync cam 334 will longitudinally move along the drive shaft 332, which is cylindrical in the current embodiment. As can be seen in FIG. 15, the drive shaft 332 extends through a bore 1570, which itself extends through the flanged end 134 of the outlet portion 130 to be connected to the machine screw actuator 278a, which is mounted on the flanged end 134 of the outlet portion 130. The drive shaft 332 is connected to the machine screw actuator 278a by a drive shaft flange 1532 coupled to an actuator flange 1534 with a plurality of drive shaft flange bolts 1535, though the drive shaft 332 may be connected to the machine screw actuator 278a by any method in other embodiments. In the current embodiment, to seal the remainder of the bore 1570 surrounding the drive shaft 332, the bore 1570 includes a bearing 1572, a shaft packing seal 1574, a retainer plate 1576, and a plurality of bolts 1578 to hold the retainer plate 1576 in place.

Although it appears in the figure that there are two bearings, two shaft packing seals, and two retainer plates, there is actually only one of each because each of these are circular and extend entirely around the drive shaft 332 to seal the bore 1570, but this is not required. In the current embodiment, the bearing 1572 is made of bronze material, the shaft packing seal 1574 is made of rubber, and the retainer plate 1576 and the bolts 1578 are made of metal material. The material used and arrangement for sealing the bore 1570 in the disclosure and the current embodiment is not meant to be limiting, and one skilled in the art would know of other ways to seal the bore 1570. As can be seen in the current embodiment, the drive shaft 332 is coupled to the machine screw actuator 278a, which is coupled to the actuator motor 175 (as seen in FIG. 2). In the current embodiment, the machine screw actuator 278a enables the drive shaft 332 to rotate, translating rotational movement from the actuator motor 175 to the drive shaft 332. The machine screw actuator 278a, in the current embodiment, includes four actuator spacers 279a,b,c,d, which are coupled to the flanged end 134 of the outlet portion 130 and allow the machine screw actuator 278a to be positioned at a distance from the flanged end 134. Although the present disclosure includes a machine screw actuator 278a, such disclosure is not meant to be limiting and one of skill in the art would recognize other ways to enable to drive shaft 332 to rotate. Additionally, the actuator spacers 279a,b,c,d of the present disclosure are not meant to be limiting, and one of skill in the art would recognize that more or fewer actuator spacers could be used. Moreover, the machine screw actuator 278a could be separate from the drive shaft 332 or located in a different position relative to the sleeve valve 100. More than one of these configurations in FIG. 15 may be used for the sleeve valve 100. Additionally, in the current embodiment, drive line 340 also includes the same configuration as drive line 330 and the same actuator connection between the drive shaft 342 and the machine screw actuator 278b as drive line 330 does to machine screw actuator 278a. However, the configuration and actuator arrangement of drive line 340 is not required to be the same as drive line 330 and may be different in various embodiments. Moreover, as described above in FIG. 3, drive line 340 is included in the current embodiment, but it is not required.

Figure 16:
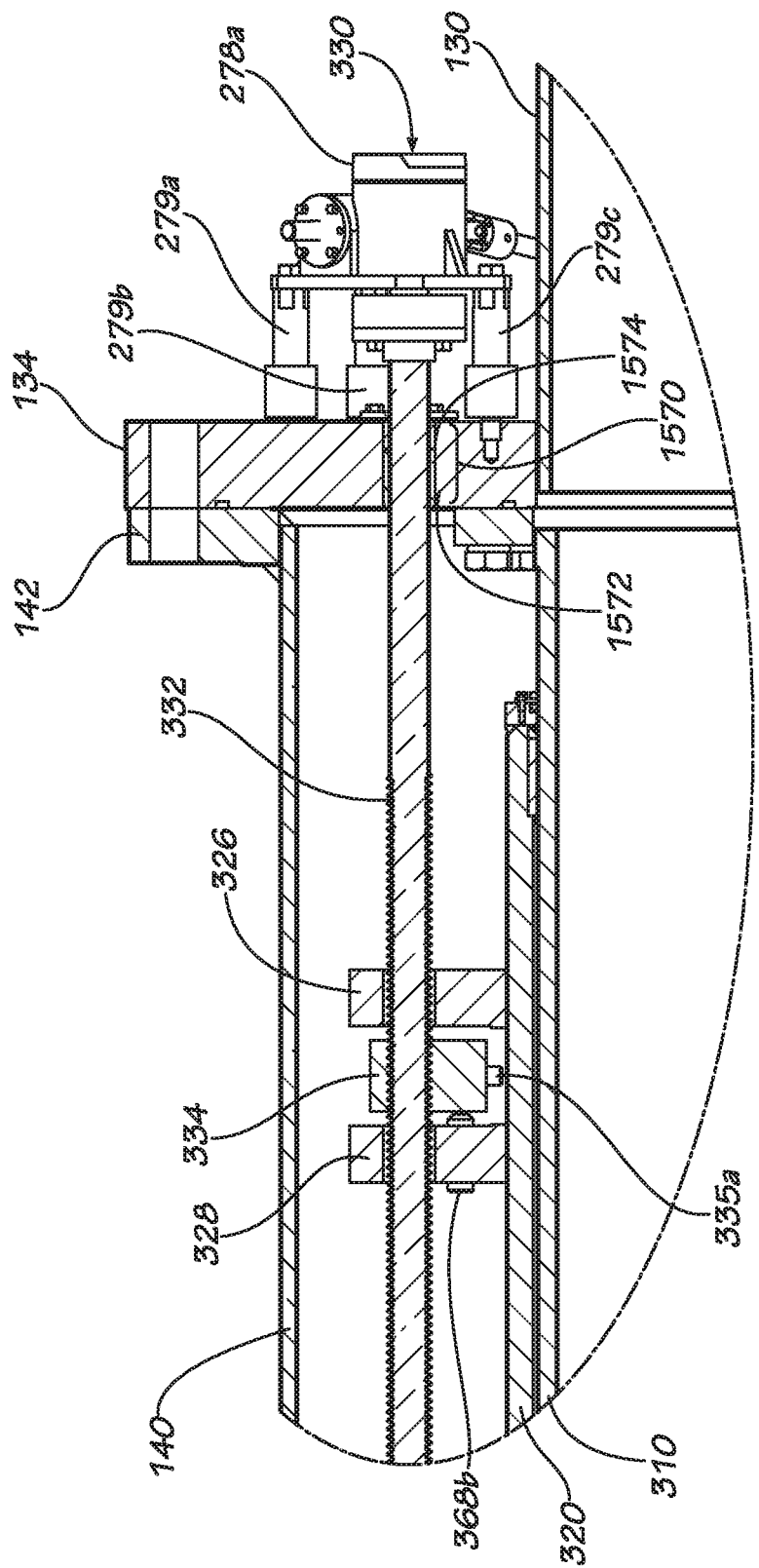
FIG. 16 is a cross-sectional view of the interior of the body cavity portion of the valve body of FIG. 1 including the drive line, gate, and sleeve valve.

As seen in FIG. 16, a cross-sectional detail view of the interior of the body cavity portion 140 including the drive line 330, gate 320, and sleeve 310, is provided. In the current embodiment, the flanged end 134 of the outlet portion 130 is coupled to flanged end 142 of the body cavity portion 140.

Figure 17A:
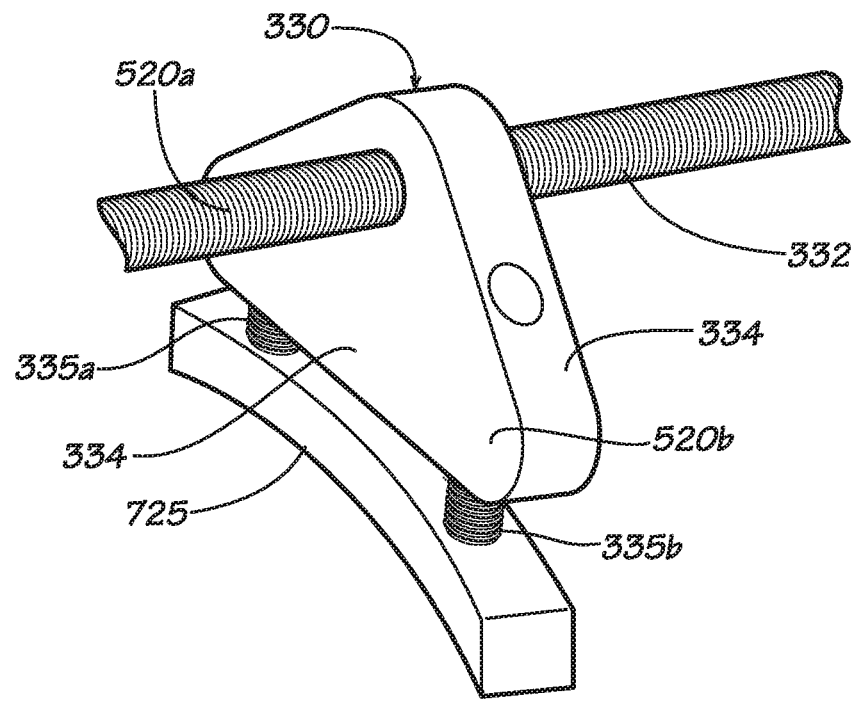
FIGS. 17A and 17B are perspective views of FIG. 4 and show the sync cam in a first position and a second position on the drive shaft, respectively.
Figure 17B:
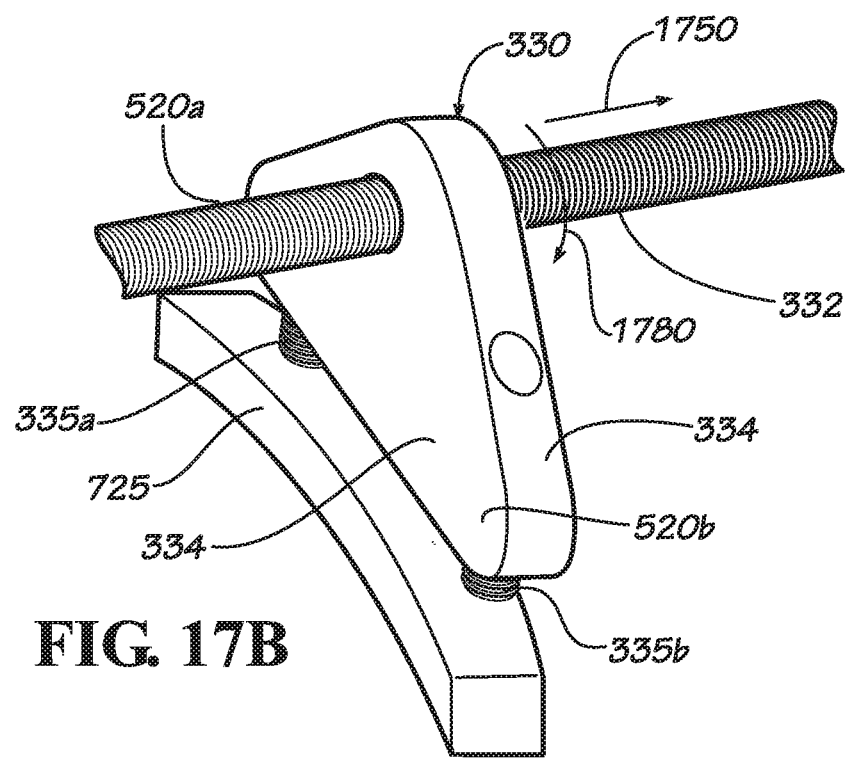

FIGS. 17A and 17B, show the adjustment stop plate 725, the sync cam 334, and the drive shaft 332 in isolation. In the current embodiment, the forward direction load balancing screws 335a and 335b of the sync cam 334 (described with respect to FIG. 4) are initially balanced and contacting the adjustment plate 725 equally, as shown in FIG. 17A. Additionally, in the current embodiment, the forward direction load balancing screws 345a and 345b of the sync cam 344 are initially contacting the adjustment plate 1245. In other embodiments, the forward direction load balancing screws 335a,b and 345a,b may contact the gate surface 721. In the current embodiment, when the forward direction load balancing screws 335a,b are in contact with the adjustment stop plate 725 and the drive shaft 332 is thereafter turned, the sync cam 334 will move linearly with respect to the drive shaft 332 toward either the front stop 326 or the back stop 328, depending on the direction the drive shafts 332 and 342 rotate. This movement takes place because the forward direction load balancing screws 335a,b, when in contact with the adjustment stop plate 725, prevent the sync cam 334 from rotating with the drive shaft 332, forcing the sync cam 334 to move linearly with respect to the drive shaft 332 due to the interaction of the threads of the drive shaft 332 with the threads 418 of the drive shaft bore 416. In the current embodiment, the sync cam 344 moves linearly with respect to the drive shaft 342 in a similar manner.

As will be described in FIG. 18, during syncing of the current embodiment, when the sync cams 334 and 344 are being synced to the front stops 326 and 346, respectively, one of the sync cams 334 or 344 will contact its respective front stop 326 or 346 first. In the current embodiment, in order to have the other sync cam 334 or 344 contact its respective front stop 326 or 346 simultaneously, the forward direction load balancing screws 335a and 335b (for sync cam 334) or 345a and 345b (for sync cam 344), can be adjusted to enable the non-contacting sync cam 334 or 344 to move linearly along its respective threaded drive shaft 332 or 342. As can be seen in FIG. 17B, in the current embodiment, by turning the forward direction load balancing screw 335a,b, the sync cam 334 rotates about the drive shaft 332 and thereby moves linearly along the drive shaft 332 towards or away from the front stop 326. By screwing forward direction load balancing screw 335a downward within lobe 520a and screwing forward direction load balancing screw 335b upward within lobe 520b, sync cam 334 is rotated clockwise in a direction 1780 and thereby moves in a direction 1750 along the drive shaft 332, as shown in FIG. 17B. Screwing forward direction load balancing screw 335a upward within lobe 520a and screwing forward direction load balancing screw 335b downward within lobe 520b rotates sync cam 334 counter-clockwise and thereby moves the sync cam 334 in a direction opposite to direction 1750 along the drive shaft 332. In some embodiments, one forward direction load balancing screw 335a,b must be screwed upward before the other forward direction load balancing screw 335b,a can be screwed downward so that the sync cam 334 can be rotated. In these embodiments, once the sync cam 334 is rotated to the correct position, both forward direction load balancing screws 335a,b must be screwed downward sufficiently to contact the adjustment stop plate 725 to prevent further rotation of the sync cam 334. In the current embodiment, the sync cam 344 is moved linearly with respect to the drive shaft 342 in a similar manner. The disclosure described above is not meant to be limiting, and one of skill in the art would recognize that there are other ways such tasks may be performed.

Figure 18A:
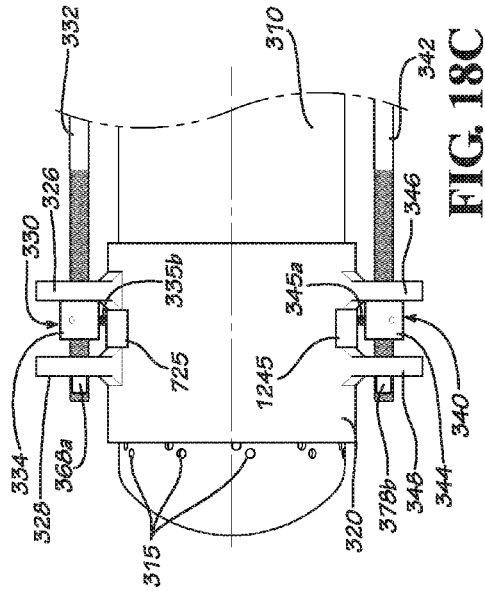
FIGS. 18A, 18B, 18C, 18D, and 18E show a side view of the drive assembly and gate of FIG. 12 and show a method for syncing the sleeve valve.

FIGS. 18A, 18B, 18C, 18D, and 18E show a syncing process for the sleeve valve 100. Syncing may be used to ensure that each drive line 330 and 340 is applying opening or closing force to the gate 320 at the same time and with the same degree of force, which will prolong the longevity of each drive line 330 and 340 and the actuator motor 175 and will ensure smooth opening and closing of the gate 320. In the current embodiment, syncing ensures that each drive line 330 and 340 is working the same amount by accounting for the machine tolerances in each of the drive lines 330 and 340, the front stops 326 and 346, the back stops 328 and 348, and the splitter 274. Syncing may occur during installation, but it can also be achieved, via the inspection ports 190a and 190b, later when the sleeve valve 100 is assembled. As seen in FIG. 18A, when syncing begins the sync cams 334 and 344 may be in a neutral position, meaning the forward direction load balancing screws 335a,b, 345a,b are all equally screwed down to contact the adjustment plates 725,1245, respectively and the sync cams 334 and 344 are not touching the front stops 326,346, respectively or the back stops 328,348, respectively. However, the sync cams 334 or 344 are not required to begin in a neutral position.

Figure 18B:
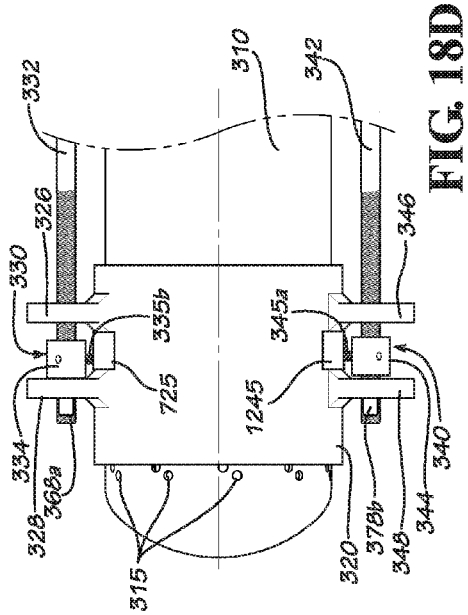
Figure 18C:
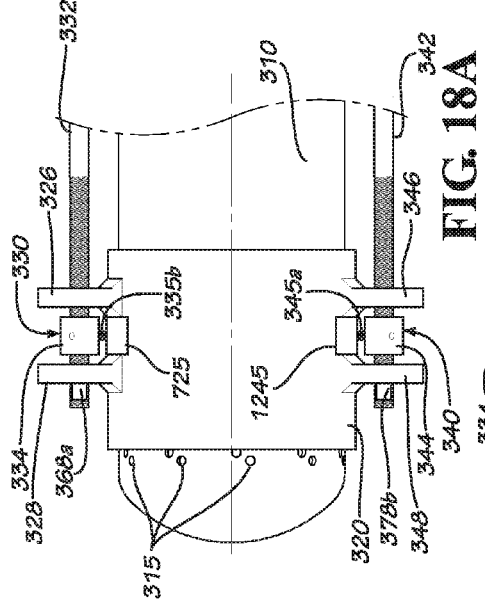

In the current embodiment, because the drive lines 330, 340 are both connected to a single actuator motor 175, the drive shafts 332,342 turn at approximately equal speeds and the sync cams 334,344 move linearly together along the drive shafts 332,342. In order to sync the sync cams 334 and 344 in a front stop position so that both sync cams 334,344 contact front stops 326,346 simultaneously, as shown in FIG. 18C, the sync cams 334 and 344 are moved linearly together towards respective front stops 326,346 so that at least one of the sync cams 334,344 contact a front stop 326 or 346. As shown in FIG. 18B, the sync cams 334,344 may not contact the front stops 326,346 simultaneously prior to syncing in the front stop position. Once one of the sync cams 334,344 contacts a front stop 326 or 346, the non-contacting sync cam 334 or 344 is moved linearly along its respective threaded drive shaft 332 or 342 so that both sync cams 334,344 contact the front stops 326,346, as can be seen in FIG. 18C. At this point, in FIG. 18C, the sync cams 334 and 344 are synced in the front stop position.

Figure 18D:
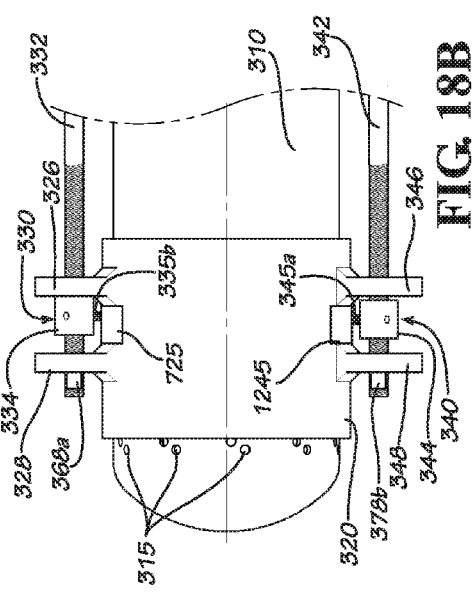
Figure 18E:
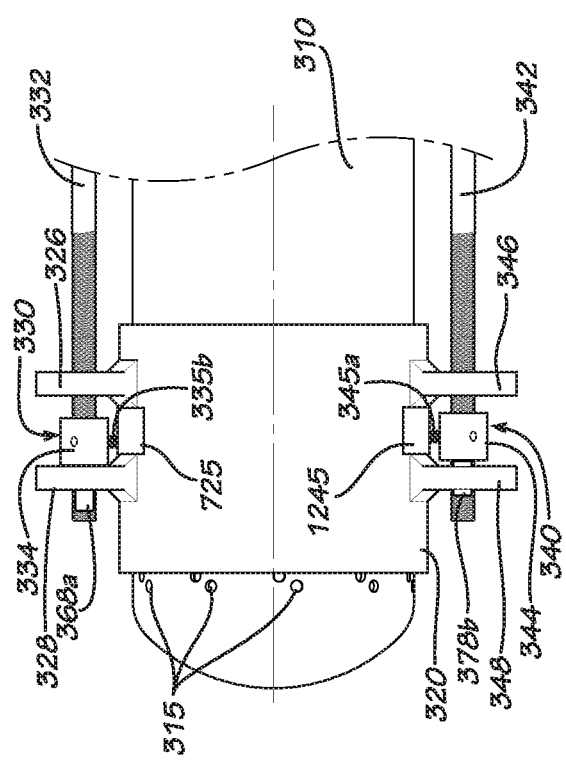

As seen in FIG. 18D of the current embodiment, to sync each sync cam 334 and 344 in the back stop position the sync cams 334,344 are moved linearly towards the back stops 328,348 until at least one of the sync cams 334 and 344 contact its respective back stop 328 or 348. The backward direction load balancing screws (368a and 368b or 378a and 378b) of the non-contacting back stop 328 or 348 are then turned to move the backward direction load balancing screws 368a,b or 378a,b towards the non-contacting sync cam 334 or 344 and into contact with the non-contacting sync cam 334 or 344. The non-contacting sync cam 334 or 344 thereby effectively contacts its respective back stop 328 or 348 by contacting the backward direction load balancing screws 368a,b or 378a,b with the non-contacting sync cam 334 or 344, as shown in FIG. 18E. In other embodiments, when the sync cams 334,344 are moved linearly towards the back stops 328,348, at least one of the sync cams 334 and 344 contacting its respective back stop 328 or 348 may include at least one of the sync cams 334 and 344 contacting at least one backward direction load balancing screw 368a, 368b, 378a, or 378b. In these embodiments, syncing the sync cams 334,344 in the back stop position includes placing each backward direction load balancing screw 368a,b and 378a,b in contact with the sync cams 334,344.

In the current embodiment, after syncing in the front stop position and syncing in the back stop position have occurred, syncing is complete. The disclosure described above is not meant to be limiting, and one of skill in the art would recognize that there are other ways such tasks may be performed.

Figure 19E:
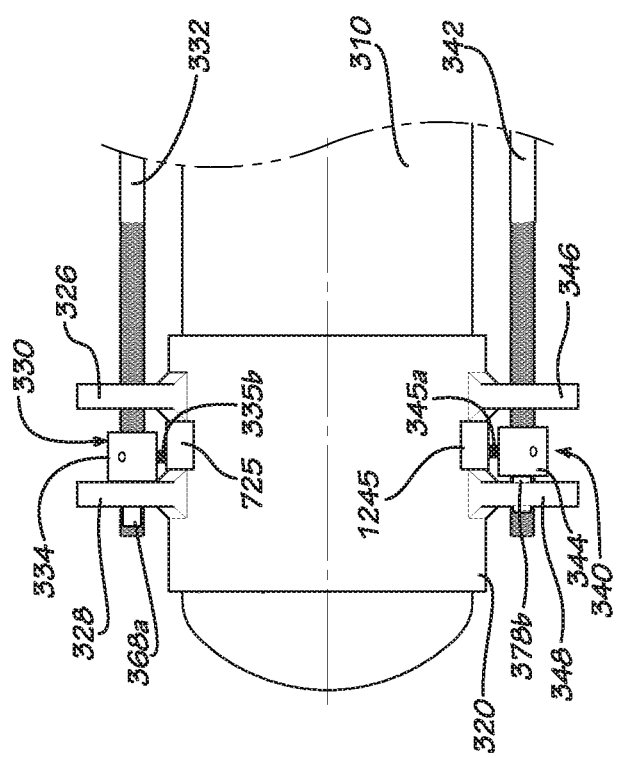

FIGS. 19A, 19B, 19C, 19D, and 19E show how the gate 320 moves in operation after syncing has occurred. FIG. 19A shows the sync cams 334 and 344 in neutral positions (as described in FIG. 18) and the gate 320 in a half open position. Neither the gate 320 nor the sync cams 334 and 344 must start in this position, and this position is merely described for purposes of example. In FIG. 19B of the current embodiment, the drive shafts 332,342 have been rotated in such a way that the sync cams 334,344 are moved linearly along the drive shafts 332,342, respectively, toward the front stops 326 and 346. If syncing in the front stop position has already occurred, then the sync cams 334 and 344 should contact their respective front stops 326 and 346 at the same time. To ensure that the sync cams 334,344 do not rotate upon rotation of the drive shafts 332,342, the forward direction load balancing screws 335a,b and 345a,b should be screwed down into contact with the adjustment plates 725,1245 or, in alternative embodiments, the gate surface 721, though rotation the sync cams 334,344 may be prevented in other manners in other embodiments. As seen in FIG. 19C of the current embodiment, after the sync cams 334 and 344 contact their respective front stops 326 and 346 and the drive shafts 332 and 342 continue to rotate in the same direction, the gate 320 is moved toward the open position (where more or all of the perforations 315 are exposed). In the open position, the gate 320 allows fluid to flow from the inlet 125 through the perforations 315 to the outlet 135. FIG. 19C shows the gate 320 in its most open position for the current embodiment.

In FIG. 19D of the current embodiment, the drive shafts 332 and 342 have been rotated in such a way that the sync cams 334 and 344 are moved toward the back stops 328 and 348. If syncing in the back stop position has already occurred, then the sync cams 334 and 344 should contact their respective back stops 328 and 348 at the same time (including effective contact with the backward direction load balancing screws 368a,b or 378a,b). As seen in FIG. 19E of the current embodiment, after the sync cams 334 and 344 contact their respective back stops 328 and 348 (or effectively contact the backward direction load balancing screws 368a and 368b or 378a and 378b) and the drive shafts 332 and 342 continue to rotate in the same direction, the gate 320 is moved toward the closed position (where more or all of the perforations 315 are covered). In the closed position, the gate 320 restricts fluid flow from the inlet 125 through the perforations 315 to the outlet 135. FIG. 19E shows the gate 320 in its most closed position for the current embodiment. In these embodiments, space between the sync cams 334, 344 and the respective front stops 326,346 and back stops 328,348 operates to allow the sync cams 334,344 to "hammer" the gate 320, thereby budging the gate 320 from its resting position. With this arrangement, the gate 320 may be more easily moved by the sync cams 334,344 than if it were arranged with little or no space between the sync cams 334,344, the front stops 326,346, and the back stops 328, 348, respectively, because the sync cams 334,344 gain momentum and hit the respective front stops 326,346 with an inertia that provides additional force than if no inertia was present. This "hammer" effect may also dislodge the gate 320 in circumstances where the gate 320 gets stuck on the sleeve 310.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of controlling the flow of a fluid in a pipe system comprising:
   controlling a sleeve valve in the pipe system, the sleeve valve including
      a valve body having an inner surface and an outer surface, the inner surface and the outer surface defining an inlet, an outlet, and a body cavity between the inlet and the outlet;
      a sleeve disposed at least partially within the body cavity, the sleeve including at least one opening fluidly connecting the inlet to the outlet;
      a gate proximate to the sleeve, the gate including a front stop and a back stop; and
      a drive assembly including a pair of drive lines, each drive line including a drive shaft, a first drive line of the pair of drive lines including a sync cam on the drive shaft of the first drive line, the sync cam of first drive line movably positioned between the front stop and the back stop, a first gap defined between the front stop and the sync cam, a second gap defined between the back stop and the sync cam;
   moving the sync cam to a front stop position, wherein the front stop position reduces the first gap; and
   moving the gate to uncover the at least one opening to allow fluid to flow from the inlet to the outlet.

2. The method of claim 1, further comprising partially obstructing the at least one opening with the gate to partially reduce a flow rate of fluid from the inlet to the outlet.

3. The method of claim 1, wherein each drive line of the pair of drive lines is connected to an actuator motor, the method further comprising turning the drive shaft of each drive line at equal speeds.

4. The method of claim 1, wherein:
the front stop is a first front stop, the back stop is a first back stop, and the sync cam is a first sync cam; and
the sleeve valve further includes a second drive line of the pair of drive lines, the second drive line including a second sync cam, the second sync cam movably positioned on the drive shaft of the second drive line and between a second back stop and a second front stop, a third gap defined between the second front stop and the second sync cam, and a fourth gap defined between the second back stop and the second sync cam.

5. The method of claim 4, wherein the front stop position is a first front stop position, the method further comprising moving the second sync cam to a second front stop position, wherein the second front stop position reduces the third gap.

6. The method of claim 5, wherein the first sync cam contacts the first front stop at the first front stop position.

7. The method of claim 6, wherein the second sync cam contacts the second front stop at the second front stop position simultaneously with the first sync cam contacting the first front stop at the first front stop position.

8. The method of claim 6, further comprising syncing the first sync cam and the second sync cam if the second sync cam does not contact the second front stop at the second front stop position simultaneously with the first sync cam contacting the first front stop, wherein syncing causes the first sync cam to contact the first front stop at the first front stop position simultaneously with the second sync cam contacting the second front stop at the second front stop position.

9. The method of claim 8, wherein the second sync cam further comprises at least one front direction load balancing screw and wherein syncing the first sync cam and the second sync cam comprises adjusting the at least one front direction load balancing screw to cause the second sync cam to contact the second front stop at the second front stop position simultaneously with the first sync cam contacting the first front stop at the first front stop position.

10. The method of claim 4, further comprising
moving the first sync cam to a first back stop position, wherein the first back stop position reduces the second gap; and
moving the gate to cover the at least one opening to reduce fluid from flowing from the inlet to the outlet.

11. The method of claim 10, further comprising moving the second sync cam to a second back stop position, wherein the second back stop position reduces the fourth gap, and wherein the first sync cam contacts the first back stop at the first back stop position.

12. A method of controlling the flow of a fluid in a pipe system comprising:
controlling a sleeve valve in the pipe system, the sleeve valve including
a valve body having an inner surface and an outer surface, the inner surface and the outer surface defining an inlet, an outlet, and a body cavity between the inlet and the outlet;
a sleeve disposed at least partially within the body cavity, the sleeve including at least one opening fluidly connecting the inlet to the outlet;
a gate proximate to the sleeve, the gate including a front stop and a back stop; and
a drive assembly including a pair of drive lines, each drive line including a drive shaft, a first drive line of the pair of drive lines including a sync cam on the drive shaft of the first drive line, the sync cam of first drive line movably positioned between the front stop and the back stop, a first gap defined between the front stop and the sync cam, a second gap defined between the back stop and the sync cam;
moving the sync cam to a back stop position, wherein the back stop position reduces the second gap; and
moving the gate to cover at least one opening to reduce fluid from flowing from the inlet to the outlet.

13. The method of claim 12, wherein the at least one opening comprises a plurality of openings, the method further comprising uncovering some of the plurality of openings with the gate to partially increase a flow rate of fluid from the inlet to the outlet.

14. The method of claim 12, wherein each drive line of the pair of drive lines is connected to an actuator motor, the method further comprising turning the drive shaft of each drive line at equal speeds.

15. The method of claim 12, wherein:
the front stop is a first front stop, the back stop is a first back stop, and the sync cam is a first sync cam; and
the sleeve valve further includes a second drive line of the pair of drive lines, the second drive line including a second sync cam, the second sync cam movably positioned on the drive shaft of the second drive line and between a second back stop and a second front stop, a third gap defined between the second front stop and the second sync cam, and a fourth gap defined between the second back stop and the second sync cam.

16. The method of claim 15, wherein the back stop position is a first back stop position, the method further comprising moving the second sync cam to a second back stop position, wherein the second back stop position reduces the fourth gap.

17. The method of claim 16, wherein the first sync cam contacts the first back stop at the first back stop position.

18. The method of claim 17, wherein the second sync cam contacts the second back stop at the second back stop position simultaneously with the first sync cam contacting the first back stop at the first back stop position.

19. The method of claim 17, further comprising syncing the first sync cam and the second sync cam if the second sync cam does not contact the second back stop at the second back stop position simultaneously with the first sync cam contacting the first back stop, wherein syncing causes the first sync cam to contact the first back stop at the first back stop position simultaneously with the second sync cam contacting the second back stop at the second back stop position.

20. The method of claim 19, wherein the second back stop further comprises at least one backward direction load balancing screw and wherein syncing the first sync cam and the second sync cam comprises adjusting the at least one backward direction load balancing screw to contact the second sync cam at the second back stop position simultaneously with the first sync cam contacting the first back stop at the first back stop position.

* * * * *